(12) United States Patent
Yamamoto et al.

(10) Patent No.: US 11,669,396 B2
(45) Date of Patent: *Jun. 6, 2023

(54) STORAGE SYSTEM

(71) Applicant: Hitachi, Ltd., Tokyo (JP)

(72) Inventors: Takahiro Yamamoto, Tokyo (JP);
Hiroto Ebara, Tokyo (JP); Takeru Chiba, Tokyo (JP); Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,092

(22) Filed: Oct. 8, 2021

(65) Prior Publication Data
US 2022/0027239 A1 Jan. 27, 2022

Related U.S. Application Data

(63) Continuation of application No. 16/553,360, filed on Aug. 28, 2019, now Pat. No. 11,169,879.

(30) Foreign Application Priority Data

Dec. 27, 2018 (JP) .............................. JP2018-245308

(51) Int. Cl.
*G06F 11/10* (2006.01)
(52) U.S. Cl.
CPC ................. *G06F 11/1076* (2013.01)
(58) Field of Classification Search
CPC .......................... G06F 11/1076; G06F 11/1096
See application file for complete search history.

(56) References Cited

U.S. PATENT DOCUMENTS

| 10,592,338 | B2 | 3/2020 | Danilov |
| 11,169,879 | B2 * | 11/2021 | Yamamoto .......... G06F 11/1076 |
| 2013/0282976 | A1 | 10/2013 | Dubnicki |
| 2013/0339818 | A1 | 12/2013 | Baker |
| 2015/0019937 | A1 | 1/2015 | Baker |
| 2015/0363269 | A1 | 12/2015 | Baker |

(Continued)

FOREIGN PATENT DOCUMENTS

| WO | 2016052665 A1 | 4/2016 |
| WO | 2018/179073 A1 | 10/2018 |

OTHER PUBLICATIONS

Japanese Office Action received in corresponding Japanese Application No. 2018-245308 dated Dec. 15, 2020.

*Primary Examiner* — Thien Nguyen
(74) *Attorney, Agent, or Firm* — Mattingly & Malur, PC

(57) ABSTRACT

Provided is a storage system that performs inter-node movement of parity and reconfiguration of a stripe when a node configuration is changed. The storage system includes a plurality of nodes and a management unit, in which the nodes are targets for data write and read requests, form a stripe by a plurality of data stored in different nodes and parity generated based on the plurality of data, and store the parity of the stripe to which the data under the write request belongs in a node different from the plurality of nodes that store the plurality of data so as to perform redundancy; and the management unit transmits, to the node, an arrangement change request to perform the inter-node movement of the parity and the reconfiguration of the stripe when the node configuration is changed.

9 Claims, 24 Drawing Sheets

(56) References Cited

U.S. PATENT DOCUMENTS

| | | |
|---|---|---|
| 2016/0371145 A1 | 12/2016 | Akutsu et al. |
| 2017/0351575 A1 | 12/2017 | Baker |
| 2018/0013826 A1 | 1/2018 | Sikdar |
| 2019/0243553 A1 | 8/2019 | Yamamoto et al. |
| 2019/0332474 A1 | 10/2019 | Danilov |

* cited by examiner

FIG. 6

STORAGE POOL CONFIGURATION MANAGEMENT TABLE (412)

STORAGE POOL INFORMATION TABLE (610)

| STORAGE POOL ID (611) | TOTAL CAPACITY (BLOCK) (612) | CONSUMPTION CAPACITY (BLOCK) (613) | DEPLETION THRESHOLD (614) |
|---|---|---|---|
| 0x0000 | 0x3A8C36096 | 0xEA30D8258 | 80% |
| 0x0001 | ... | | |

VIRTUAL VOLUME MANAGEMENT TABLE (620)

| VIRTUAL VOLUME ID (621) | SIZE (BLOCK) (622) | STORAGE POOL ID (623) |
|---|---|---|
| 0x0100 | 0x21210000 | 0x00 |
| 0x0101 | 0x12301200 | 0x02 |
| 0x1100 | 0x42123000 | 0x00 |

PAGE MAPPING TABLE (630)

| VIRTUAL VOLUME ID (631) | LBA (632) | SIZE (BLOCK) (633) | POOL VOLUME ID (634) | LBA (635) |
|---|---|---|---|---|
| 0x0100 | 0x00000000 | 0x2000 | 0x1000 | 0x000000 |
| 0x0101 | 0x00000000 | 0x2000 | 0x0000 | 0xC00000 |
| 0x1100 | 0x06400000 | 0x2000 | 0x0001 | 0x800000 |
| ... | | | | |

POOL VOLUME MANAGEMENT TABLE (640)

| POOL VOLUME ID (641) | SIZE (BLOCK) (642) | LOGICAL CHUNK ID (643) |
|---|---|---|
| 0x0000 | 0x8400000 | 0x2000 |
| 0x0001 | 0x8400000 | 0x2001 |
| 0x1000 | 0x8400000 | 0x2002 |

FIG. 7

CHUNK CONFIGURATION MANAGEMENT TABLE — 413

LOGICAL CHUNK MANAGEMENT TABLE — 710

| LOGICAL CHUNK ID | SIZE (BLOCK) | CHUNK GROUP ID |
|---|---|---|
| 0x2000 | 0x8400000 | 0x5000 |
| 0x2001 | 0x8400000 | 0x5002 |
| 0x2002 | 0x8400000 | 0x6001 |

CHUNK GROUP MANAGEMENT TABLE — 720

| CHUNK GROUP ID | DATA PROTECTION POLICY | RELATED PHYSICAL CHUNK ID | MAPPING CHANGE PROGRESS INFORMATION | |
|---|---|---|---|---|
| | | | DATA | PARITY |
| 0x5000 | Mirror | 0x12000<br>0x12001 | 0x00000000 | 0x00000000 |
| 0x5002 | 3D1P | 0x12010<br>0x12021<br>0x12003<br>0x13001 | 0x00000000 | 0x00000000 |
| 0x6001 | 4D1P | 0x13011<br>0x13021<br>0x14003<br>0x15001<br>0x15002 | 0x00000000 | 0x00000000 |

PHYSICAL CHUNK MANAGEMENT TABLE — 730

| PHYSICAL CHUNK ID | START OFFSET | SIZE (BLOCK) | SITE ID/NODE ID/DRIVE ID |
|---|---|---|---|
| 0x12000 | 0x00000000 | 0xC800000 | 0x00/0x00/0x00 |
| 0x12001 | 0x0C800000 | 0xC800000 | 0x00/0x01/0x02 |
| 0x12002 | 0x00000000 | 0xC800000 | 0x01/0x03/0x00 |

STORAGE SYSTEM

BACKGROUND OF THE INVENTION

1. Field of the Invention

The present invention relates to a storage system, and is suitably applied to, for example, a storage system that performs redundancy.

2. Description of the Related Art

A plurality of storage devices in a storage system constitute a Redundant Array of Independent Disks (RAID) group, and a logical volume created based on the RAID group is provided to an upper level device (for example, a host computer).

For example, a distributed RAID is known as a technique related to the RAID. The distributed RAID is a technique that distributes and manages a stripe row including data and redundant data for restoring data in larger than m+n storage devices which are defined by a data protection policy (mDnP).

In recent years, the market for Software Defined Storage (SDS) has been expanding. In this regard, as a data protection method between nodes in SDS, there is disclosed an Erasure Coding (EC) method in which storage (data locality) of data at its own node is maintained (see WO 2016/052665 (Patent Literature 1)). According to the data protection method, it is possible to achieve both high capacity efficiency and high reliability.

Recently, there is an increasing need for the addition of nodes in storage devices, devices or the like.

In a distributed RAID of related art, a stripe row is generated after the addition for a current stripe row, and data is moved in accordance with the generated stripe row, thereby realizing the addition of nodes. However, in order to use the available capacity of the added node, the data needs to be moved from an existing node to the added node, and a storage destination of the data may be changed, which may adversely affect the storage system.

Further, when a redundancy group is formed based on the technique disclosed in Patent Literature 1, when data is moved from the existing node, there is a problem that data locality is lost and storage performance is decreased.

SUMMARY OF THE INVENTION

The invention is made in view of the above circumstances, and an object of the invention is to propose a storage system that performs inter-node movement of parity and reconfiguration of a stripe when a node configuration is changed.

In order to solve such a problem, the invention provides a storage system including a plurality of nodes and a management unit. The nodes are targets for data write and read requests, form a stripe by a plurality of data stored in different nodes and parity generated based on the plurality of data, and store the parity of the stripe to which the data under the write request belongs in a node different from the plurality of nodes that store the plurality of data so as to perform redundancy. The management unit transmits, to the node, an arrangement change request to perform inter-node movement of the parity and reconfiguration of the stripe when the node configuration is changed.

According to the configuration described above, it is possible to change the configuration by, for example, calculating the parity of the stripe rearranged in accordance with the change in configuration.

According to the invention, a storage system with high adaptability can be realized.

BRIEF DESCRIPTION OF THE DRAWINGS

FIG. 6 is a diagram showing an example of a storage pool configuration management table according to the first embodiment.

FIG. 7 is a diagram showing an example of a chunk configuration management table according to the first embodiment.

DESCRIPTION OF THE PREFERRED EMBODIMENTS

Figure 1:
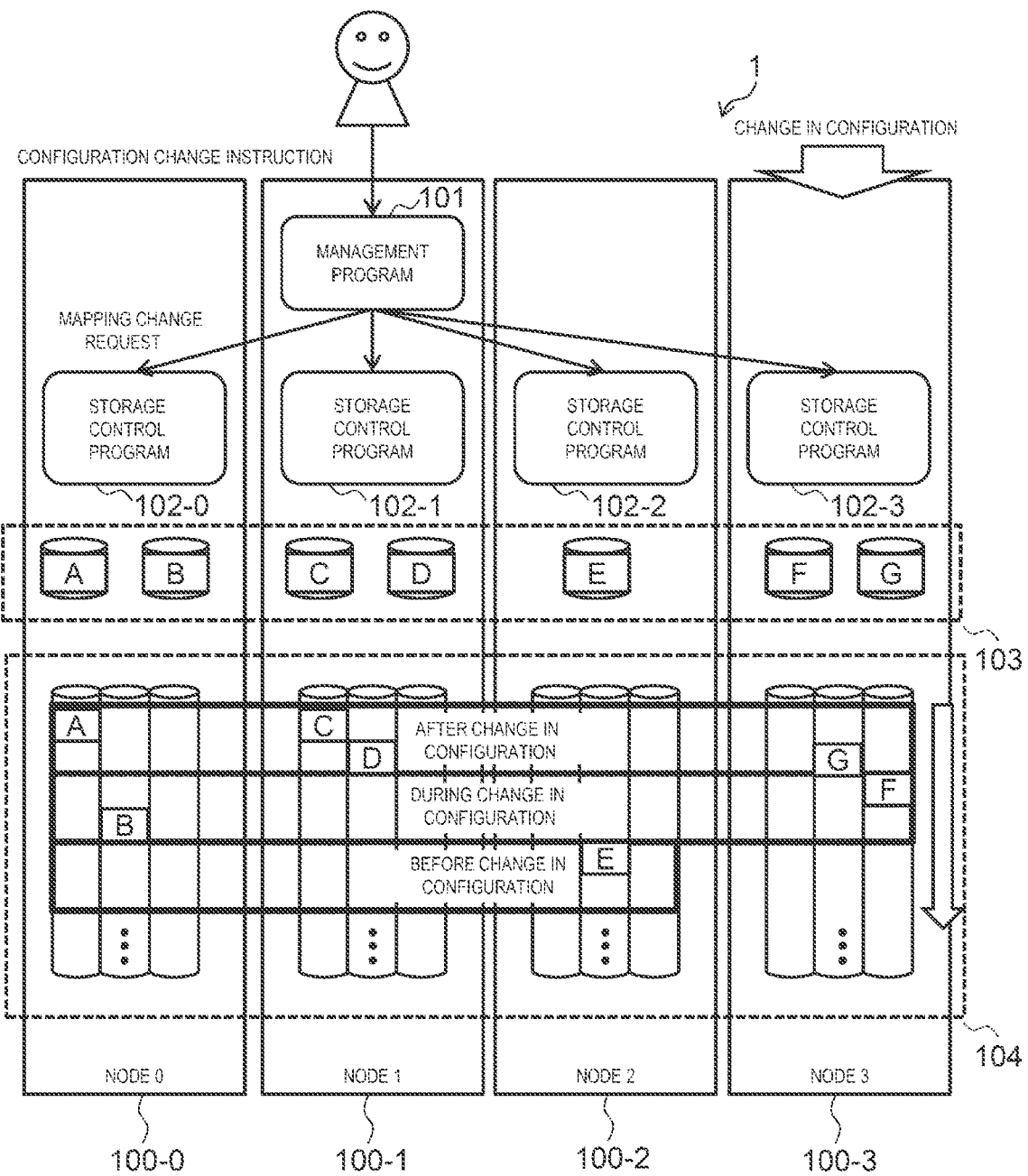
FIG. 1 is an image diagram showing an outline of a storage system according to a first embodiment.

Hereinafter, one embodiment of the invention is described in detail with reference to the drawings. The present embodiment relates to a technique capable of changing the configuration of a storage system without moving data. The storage system according to the present embodiment has one or more characteristic configurations. For example, the storage system reads out data, transfers the data to a node of a parity generation destination in a new grouping, generates parity of the new grouping, and further generates another data storage area and a new parity for the old grouping. Further, for example, the storage system determines the grouping so that a ratio between the number of data of each node and the number of parity is uniform. In addition, for example, the storage system determines that an added target is a node or a device, and when it is determined that the device to be added, regrouping is performed by moving the data between the devices in the node. Hereinafter, other characteristic configurations are also shown.

In the following description, when the same type of element is not distinguished and described, a common portion (portion except for the branch number) among the reference numerals including the branch number is used, and when the same type of element is distinguished and described, a reference numeral including the branch number may be used. For example, "node 100" is described when a node is described without being particularly distinguished, and "node 100-0" and "node 100-1" may be described when individual nodes are distinguished and described.

(1) First Embodiment

In FIG. 1, reference numeral 1 denotes a storage system according to a first embodiment as a whole.

FIG. 1 is an image diagram showing an outline of a storage system 1. The storage system 1 includes one or more nodes 100 (for example, a server device).

A user issues an instruction to change the configuration of the storage system 1 (such as an instruction to add a node 100) to a management program 101 via a client node (for example, a client device) (not shown). The management program 101 issues a mapping change request accompanying the change in the configuration to a storage control program 102 on each node 100. The mapping change request is a request to change the arrangement (stripe) of the parity related to data redundancy without changing the node 100 that stores the data (for example, moving the data). The storage control program 102 calculates the parity according to the mapping change request and rewrites the parity.

The management program 101 (coordinator: also referred to as an arbitration program) may be provided in any node, may be provided in all nodes 100, may be provided in a part of the nodes 100, or may be provided in an independent node where the storage control program 102 does not exist.

The management program 101 issues, for example, a mapping change request so as to execute calculation of the parity by mapping change processing, with a physical area 104 allocated to a logical area 103 as a processing target. According to such a configuration, unnecessary calculation and transfer of data necessary for calculation are reduced with respect to unused physical area 104.

Hereinafter, storage resource to be changed (added or reduced) in the configuration will be described mainly by taking the node 100 as an example. However, other storage resources including a site such as a data center, a storage device such as a drive, and the like may be similarly processed.

Figure 2:
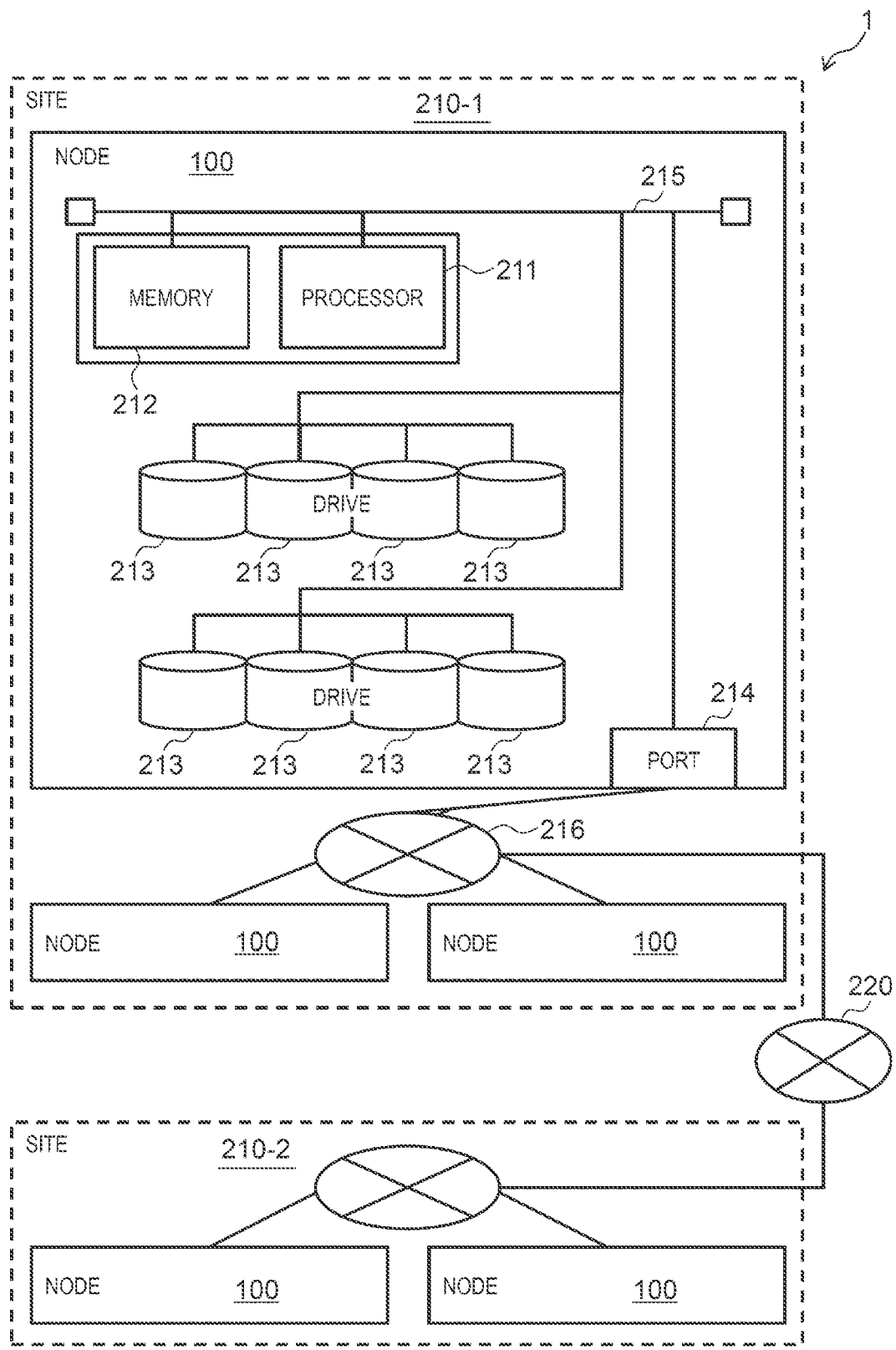
FIG. 2 is a diagram showing an example of a physical configuration of the storage system according to the first embodiment.

FIG. 2 is a diagram showing an example of a physical configuration of the storage system 1.

One or more sites 210 may be provided in the storage system 1. The sites 210 are communicatively connected via a network 220. The network 220 is, for example, a Wide Area Network (WAN), but is not limited to the WAN.

The site 210 is a data center or the like, and is configured to include one or more nodes 100.

The node 100 may have a general server computer configuration. The node 100 is configured to include, for example, one or more processor packages including a processor 211, a memory 212 and the like, one or more drives 213, and one or more ports 214. The respective components are connected via an internal bus 215.

The processor 211 is, for example, a Central Processing Unit (CPU) which performs various processing.

The memory 212 stores control information necessary for realizing functions of the node 100, and stores cache data. Further, the memory 212 stores, for example, a program executed by the processor 211. The memory 212 may be a volatile Dynamic Random Access Memory (DRAM), a non-volatile Storage Class Memory (SCM), or other storage devices.

The drives 213 store various types of data, programs, and the like. The drive 213 may be a non-volatile memory (SCM: Storage Class Memory) and the like in addition to a Serial Attached SCSI (SAS) or a Serial Advanced Technology Attachment (SATA)-connected Hard Disk Drive (HDD) or Solid State Drive (SSD), and Non-Volatile Memory Express (NVMe)-connected SSD, and is an example of a storage device.

The port 214 is connected to a network 216 and is communicatively connected to other nodes 100 in the site 210. The network 216 is, for example, a Local Area Network (LAN), but is not limited to the LAN.

The physical configuration of the storage system 1 is not limited to the contents described above. For example, the networks 216 and 220 may be redundant. For example, the network 216 may be separated into a network for management and a network for storage, and a connection standard may be Ethernet (registered trademark), Infiniband, or wireless, and a connection topology is also not limited to the configuration shown in FIG. 2.

Figure 3:
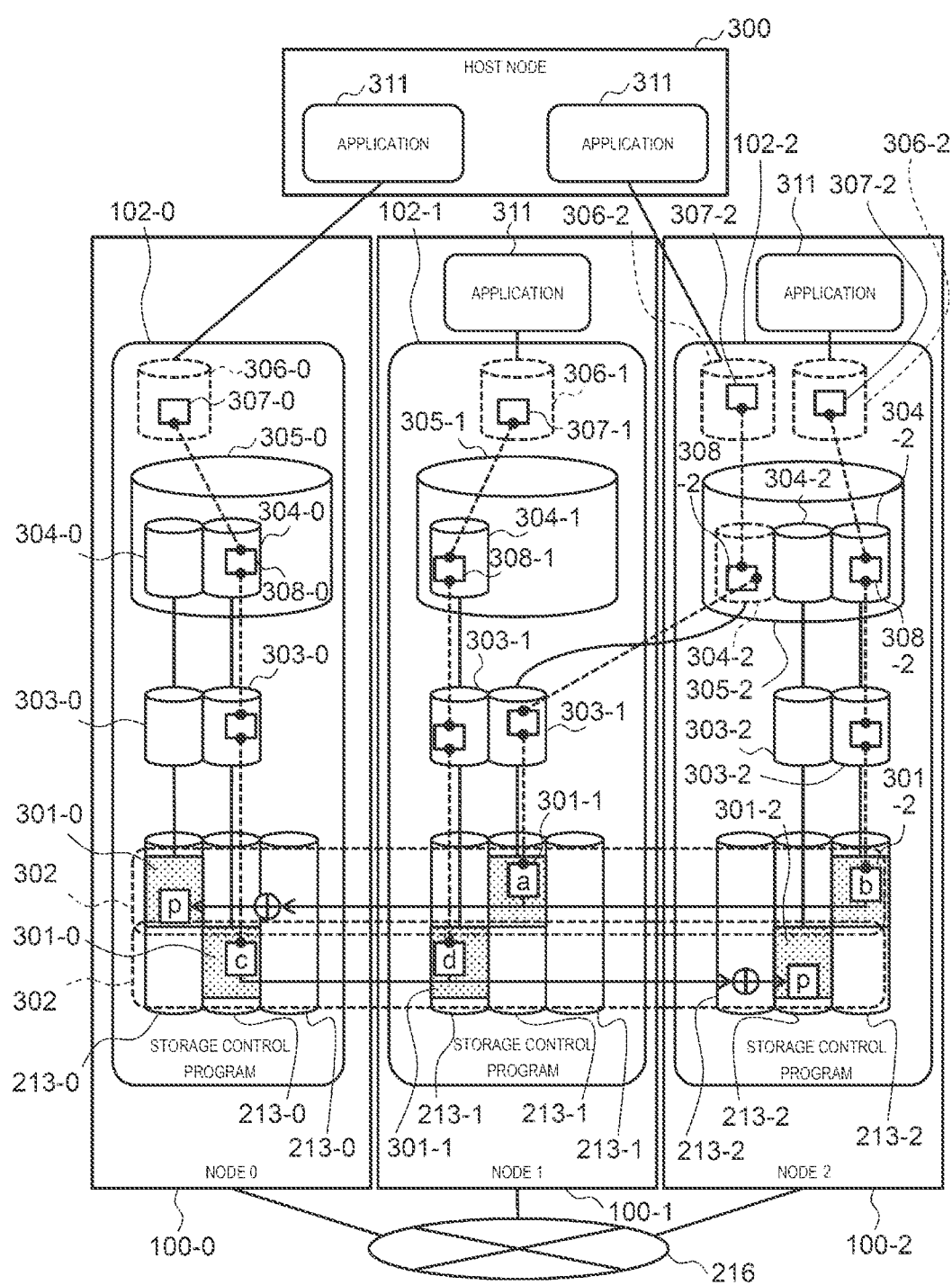
FIG. 3 is a diagram showing an example of a logical configuration of the storage system according to the first embodiment.

FIG. 3 is a diagram showing an example of a logical configuration according to the storage system 1. In the storage system 1, storage virtualization is performed, and a plurality of physical areas is virtually integrated, and is used as one storage pool. Further, in the storage system 1, only the capacity currently used by each host node 300 is allocated by thin provisioning.

More specifically, as shown in FIG. 3, the drive 213 has a data storage area which is a physical area for storing data, parity, and the like. A physical chunk 301, which is an area of all or a part of the data storage area and is a continuous area, is allocated to a chunk group 302.

The chunk group 302 is constituted by the physical chunks 301 of the drives 213 of the plurality of nodes 100. For example, when a data protection policy is 4D1P, the chunk group 302 is constituted by five physical chunks 301 secured from the drives 213 of different nodes 100.

Here, examples of the data protection policy include Erasure Coding (EC) and Multi-stage Erasure Coding (MEC). Note that, as the EC, there are a first method that does not hold data locality and a second method that holds data locality (for example, a method described in International Publication number 2016/52665), and both of the methods may be applied to the storage system 1. In the present embodiment, a case where the second method is applied will be mainly described as an example.

In other words, for example, in a 2D1P EC of the first method, data under a write request is divided into first data and second data, and the first data is stored in a first node 100, the second data is stored in a second node 100, and the parity of the first data and the second data is stored in a third node 100 to implement redundancy. Further, for example, in the 2D1P EC of the second method, the data under the write request is divided into first data and second data, and the first data and the second data is stored in a first node 100 (own node 100), the parity of the first data is stored in a second node 100, and the parity of the second data is stored in a third node 100 to implement redundancy. The MEC will be described later with reference to FIG. 20.

A logical chunk 303 is cut out from the chunk group 302. The logical chunk 303 is a unit for allocating a capacity to a storage pool 305 of each node 100. One logical chunk 303 or a plurality of logical chunks 303 may be cut out from one chunk group 302.

In other words, for example, when the data protection policy is 4D1P, ⅘ of a total amount of physical chunks 301 allocated to the chunk group 302 can be used as a data storage area, and ⅕ of the total amount of the physical chunks 301 allocated to the chunk group 302 can be used as a parity storage area. That is, the maximum capacity that can be cut out as the logical chunk 303 differs depending on the data protection policy.

The cut out logical chunk 303 is attached to the storage pool 305 as a pool volume 304. The storage pool 305 includes one or more pool volumes 304. A virtual volume 306 used by an application 311 is cut out from the storage pool 305. That is, a storage control program 102 allocates the capacity corresponding to the user's request as the virtual volume 306 without allocating the capacity to the drive 213.

For example, when a write request is received from the application 311, the storage control program 102 allocates a page 307 of the virtual volume 306 (more specifically, a physical area of the physical chunk 301 linked to the page 307) when it is a new write. The page 307 is associated with the page 308 of the pool volume 304. When it is an update write, the storage control program 102 specifies the physical area of the physical chunk 301 linked to the allocated page 307 and updates the data. The data under the write request (or intermediate data to be described later) is transferred to other nodes 100 related to data redundancy to update the parity.

In this way, the storage control program 102 manages the drive 213 as a shared storage pool 305, and allocates the capacity to the drive 213 in accordance with the amount of data written in the virtual volume 306. As a result, waste of the unused drive 213 is eliminated, and efficient operation is performed.

Hereinafter, when the data is updated, the data is mainly described by taking an example of a configuration in which the data is stored in the drive 213 (local drive) of the node 100 that has received the write request (configuration in which the data locality is maintained and the network overhead at the time of reading is excluded).

Note that, the application 311 that has access to the data may be provided in the host node 300 to operate, or may be provided in the same node 100 as the storage control program 102 to operate, or may be provided in other nodes 100 to operate.

Figure 4:
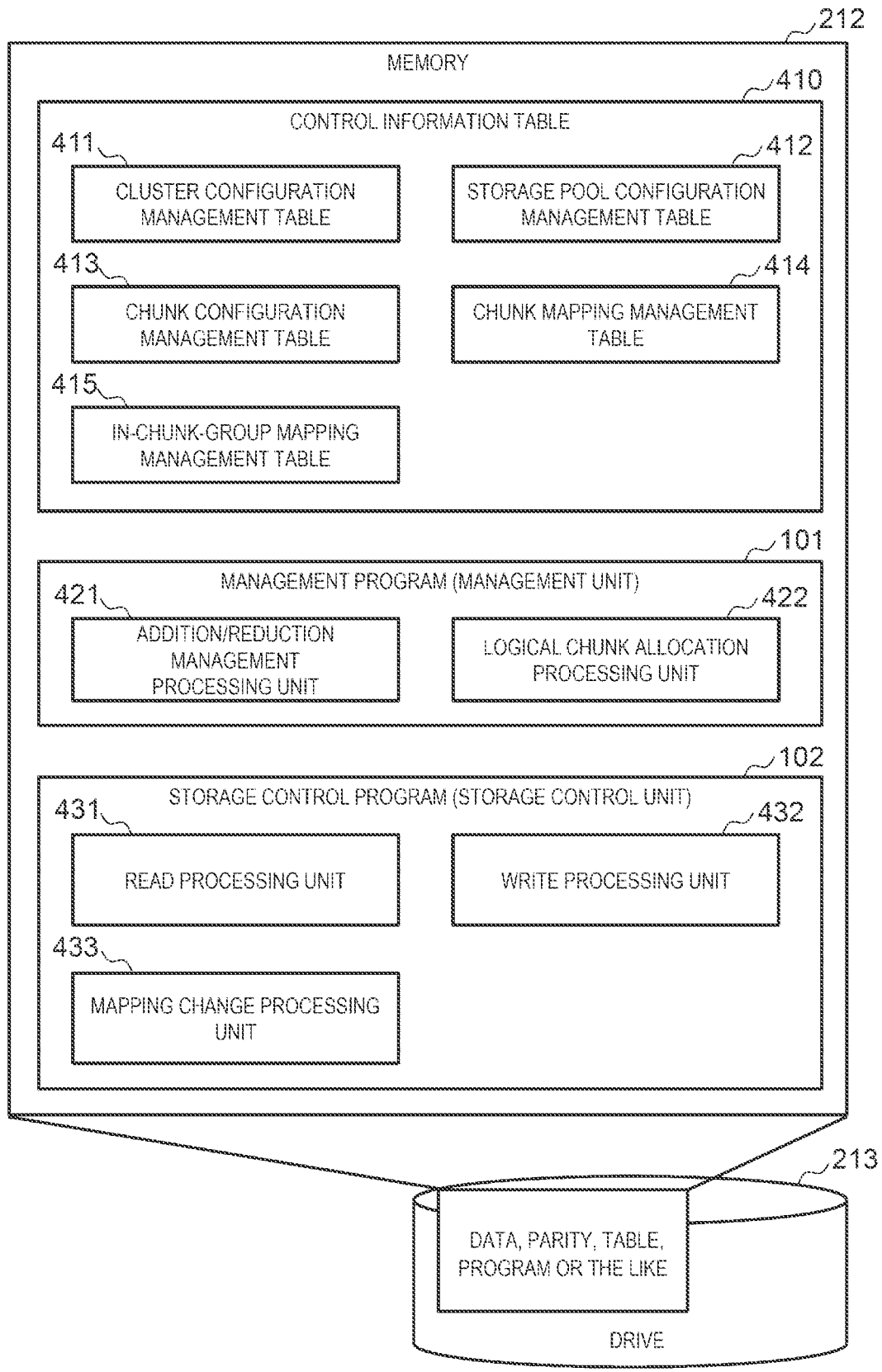
FIG. 4 is a diagram showing an example of information in a memory according to the first embodiment.

FIG. 4 is a diagram showing an example of information in the memory 212 (information read out from the drive 213 to the memory 212). A control information table 410 and various programs (the management program 101, the storage control program 102, and the like) are loaded on the memory 212 during execution, however are stored in a non-volatile area such as the drive 213 in preparation for a power failure or the like.

The control information table 410 includes a cluster configuration management table 411, a storage pool configuration management table 412, a chunk configuration management table 413, a chunk mapping management table 414, and an in-chunk-group mapping management table 415. Each table will be described later with reference to FIGS. 5 to 9.

The management program 101 is an example of a management unit, and includes an addition/reduction management processing unit 421 and a logical chunk allocation processing unit 422.

The storage control program 102 is an example of a storage control unit, and includes a read processing unit 431, a write processing unit 432, and a mapping change processing unit 433.

The functions of the node 100 (the addition/reduction management processing unit 421, the logical chunk allocation processing unit 422, the read processing unit 431, the write processing unit 432, and the mapping change processing unit 433, and the like) may be implemented, for example, by the processor 211 reading out a program stored in the drive 213 to the memory 212 and executing the same (software), may be implemented by hardware such as a dedicated circuit, or may be implemented by combining the software and the hardware. Further, a part of the functions of the node 100 may be implemented by other computer that can communicate with the node 100.

Figure 5:
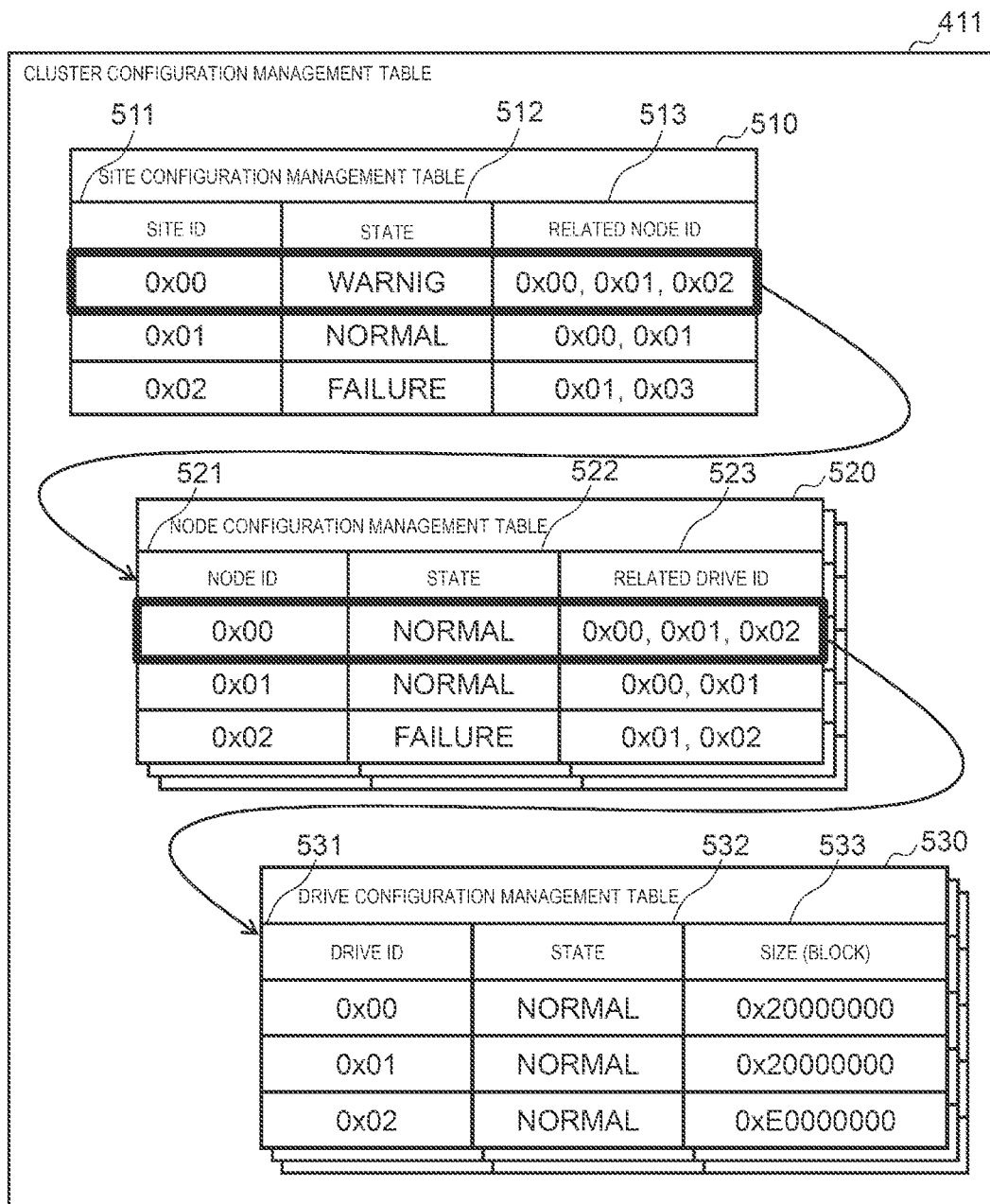
FIG. 5 is a diagram showing an example of a cluster configuration management table according to the first embodiment.

FIG. 5 is a diagram showing an example of the cluster configuration management table 411.

The cluster configuration management table 411 stores information for managing the configuration of the site 210, the node 100, and the drive 213.

The cluster configuration management table 411 includes a site configuration management table 510, a node configuration management table 520, and a drive configuration management table 530. The storage system 1 manages the site configuration management table 510, the site 210 manages the plurality of node configuration management tables 520 in the site 210, and the node 100 manages the plurality of drive configuration management tables 530 in the node 100.

The site configuration management table 510 stores information indicating a configuration related to the site 210 (a relationship between the site 210 and the node 100, and the like). More specifically, the site configuration management table 510 stores information in which a site identification (ID) 511, a state 512, and a related node ID 513 are associated.

The site ID 511 is identification information (for example, ID) capable of identifying the site 210. The state 512 is state information (NORMAL, WARNING, FAILURE, and the like) indicating the state of the site 210. The related node ID 513 is identification information (for example, ID) capable of identifying the node 100 provided in the site 210.

The node configuration management table 520 is provided for each site 210, and stores information indicating the configuration related to the node 100 provided in the site 210 (the relationship between the node 100 and the drive 213). More specifically, the node configuration management table 520 stores information in which a node ID 521, a state 522, and a related drive ID 523 are associated.

The node ID 521 is identification information (for example, ID) capable of identifying the node 100. The state 522 is state information (NORMAL, WARNING, FAILURE, and the like) indicating the state of the node 100. The related drive ID 523 is identification information (for example, ID) capable of identifying the drive 213 provided in the node 100.

The drive configuration management table 530 is provided for each node 100, and stores information indicating the configuration of the drive 213 provided in the node 100. More specifically, the drive configuration management table 530 stores information in which a drive ID 531, a state 532, and a size 533 (block) are associated.

The drive ID 531 is identification information (for example, ID) capable of identifying the drive ID 531. The state 532 is state information (NORMAL, WARNING, FAILURE, and the like) indicating the state of the drive 213. The size 533 is information indicating a capacity of the drive 213 (for example, the number of blocks). For example, the block has a fixed size (such as 512 Kbyte).

FIG. 6 is a diagram showing an example of the storage pool configuration management table 412.

The storage pool configuration management table 412 stores control information for a thin provisioning function provided by the storage pool 305.

The storage pool configuration management table 412 includes a storage pool information table 610, a virtual volume management table 620, a page mapping table 630, and a pool volume management table 640.

The storage pool information table 610 stores information related to the storage pool 305. More specifically, the storage pool information table 610 stores information in which a storage pool ID 611, a total capacity 612 (block), a consumption capacity 613 (block), and a depletion threshold 614 are associated.

The storage pool ID 611 is identification information (for example, ID) capable of identifying the storage pool 305. The total capacity 612 is information indicating the total capacity of the storage pool 305 (for example, the number of blocks). The consumption capacity 613 is information indicating the capacity consumed by the storage pool 305 (for example, the number of blocks). The depletion threshold 614 is a threshold (threshold for monitoring shortage) for determining whether or not the capacity of the storage pool 305 is depleted. When it is determined as depleted, the storage pool is expanded by the storage pool expansion processing described in FIG. 15.

The virtual volume management table 620 stores information related to the virtual volume 306 (information indicating a corresponding relationship between the virtual volume 306 and the storage pool 305 to which the virtual volume 306 is allocated). More specifically, the virtual volume management table 620 stores information in which a virtual volume ID 621, a size 622 (block), and a storage pool ID 623 are associated.

The virtual volume ID 621 is identification information (for example, ID) capable of identifying the virtual volume 306. The size 622 (block) is information indicating a capacity of the virtual volume 306 (for example, the number of blocks). The storage pool ID 623 is identification information (for example, ID) capable of identifying the storage pool 305 to which the virtual volume 306 belongs.

The page mapping table 630 stores information related to the page 307 allocated to the virtual volume 306 (information indicating a corresponding relationship between the virtual volume 306 and the pool volume 304, and the like). More specifically, the page mapping table 630 stores information in which a virtual volume ID 631, a Logical Block Addressing (LBA) 632, a size 633 (block), a pool volume ID 634, and an LBA 635 are associated.

The virtual volume ID 631 is identification information (for example, ID) capable of identifying the virtual volume 306. The LBA 632 is information (for example, a numerical value) indicating what number it is from the first page 307 of the virtual volume 306. The page 307 is a unit by which the storage control program 102 accesses the virtual volume 306. The size 633 (block) is information (number of blocks) indicating a capacity of the page 307 (page 308). The pool volume ID 634 is identification information (for example, ID) capable of identifying the pool volume 304. The LBA 635 is information (for example, a numerical value) indicating what number it is from the first page 308 of the pool volume 304. The page 308 is a unit by which the storage control program 102 accesses the pool volume 304, and has the same size as the page 307.

The size 633 may be the same for all the pages 307 or may be different for each page 307.

In other words, the storage control program 102 refers to the page mapping table 630 when converting an address of the virtual volume 306 to an address of the pool volume 304. Further, each time a new write is received, the storage control program 102 allocates the page 307 (adds a record to the page mapping table 630).

The pool volume management table 640 stores information related to the pool volume 304 (information indicating a corresponding relationship between the pool volume 304 and the logical chunk 303). More specifically, the pool volume management table 640 stores information in which a pool volume ID 641, a size 642 (block), and a logical chunk ID 643 are associated.

The pool volume ID 641 is identification information (for example, ID) capable of identifying the pool volume 304. The size 642 (block) is information indicating a capacity of the pool volume 304 (for example, the number of blocks). The logical chunk ID 643 is identification information (for example, ID) capable of identifying the logical chunk 303 attached to the pool volume 304.

Note that, the size 642 may be the same for all the pool volumes 304 or may be different for each pool volume 304.

FIG. 7 is a diagram showing an example of the chunk configuration management table 413.

The chunk configuration management table 413 stores control information for managing the configuration of the chunk group 302 (redundancy group) constituted by combining the physical chunk 301 and the plurality of physical chunks 301.

The chunk configuration management table 413 includes a logical chunk management table 710, a chunk group management table 720, and a physical chunk management table 730.

The logical chunk management table 710 stores information (logical chunk information) related to the logical chunk 303 cut out from the chunk group 302. More specifically, the logical chunk management table 710 stores information in which a logical chunk ID 711, a size 712 (block), and a chunk group ID 713 are associated.

The logical chunk ID 711 is identification information (for example, ID) capable of identifying the logical chunk 303 cut out from the chunk group 302. The size 712 is information indicating a capacity of the logical chunk 303 (for example, the number of blocks). The chunk group ID 713 is identification information (for example, ID) capable of identifying the chunk group 302 to which the logical chunk 303 belongs.

The chunk group management table 720 stores information (chunk group information) related to the chunk group 302. More specifically, the chunk group management table 720 stores information in which a chunk group ID 721, a data protection policy 722, a related physical chunk ID 723, and a mapping change progress information 724 are associated.

The chunk group ID 721 is identification information (for example, ID) capable of identifying the chunk group 302. The data protection policy 722 is a data protection policy of the chunk group 302. The related physical chunk ID 723 is identification information (for example, ID) capable of identifying the physical chunk 301 allocated to the chunk group 302. The mapping change progress information 724 is information (for example, an address) indicating a progress of the mapping change. The mapping change progress information 724 includes information in which data 725 and parity 726 are associated. The data 725 is information (for example, an address) indicating a progress of the mapping change for the data. The parity 726 is information (for example, an address) indicating a progress of the mapping change for the parity.

The physical chunk management table 730 stores information related to the physical chunk 301 (information for cutting out an area of the drive 213 from a start offset by the size and managing the area of the drive 213 as the physical chunk 301). More specifically, the physical chunk management table 730 stores information in which a physical chunk ID 731, a start offset 732, a size 733 (block), and a site ID/node ID/drive ID 734 are associated.

The physical chunk ID 731 is identification information (for example, ID) capable of identifying the physical chunk 301. The start offset 732 shows a start position when the physical chunk 301 is cut out from the drive 213. The size 733 (block) is information indicating a capacity of the physical chunk 301 (the number of blocks). The site ID/node ID/drive ID 734 is identification information (information indicating that the physical chunk 301 is cut out from which drive 213 of which node 100 of which site 210) capable of identifying the storage resource from which the physical chunk 301 is cut out.

Figure 8:
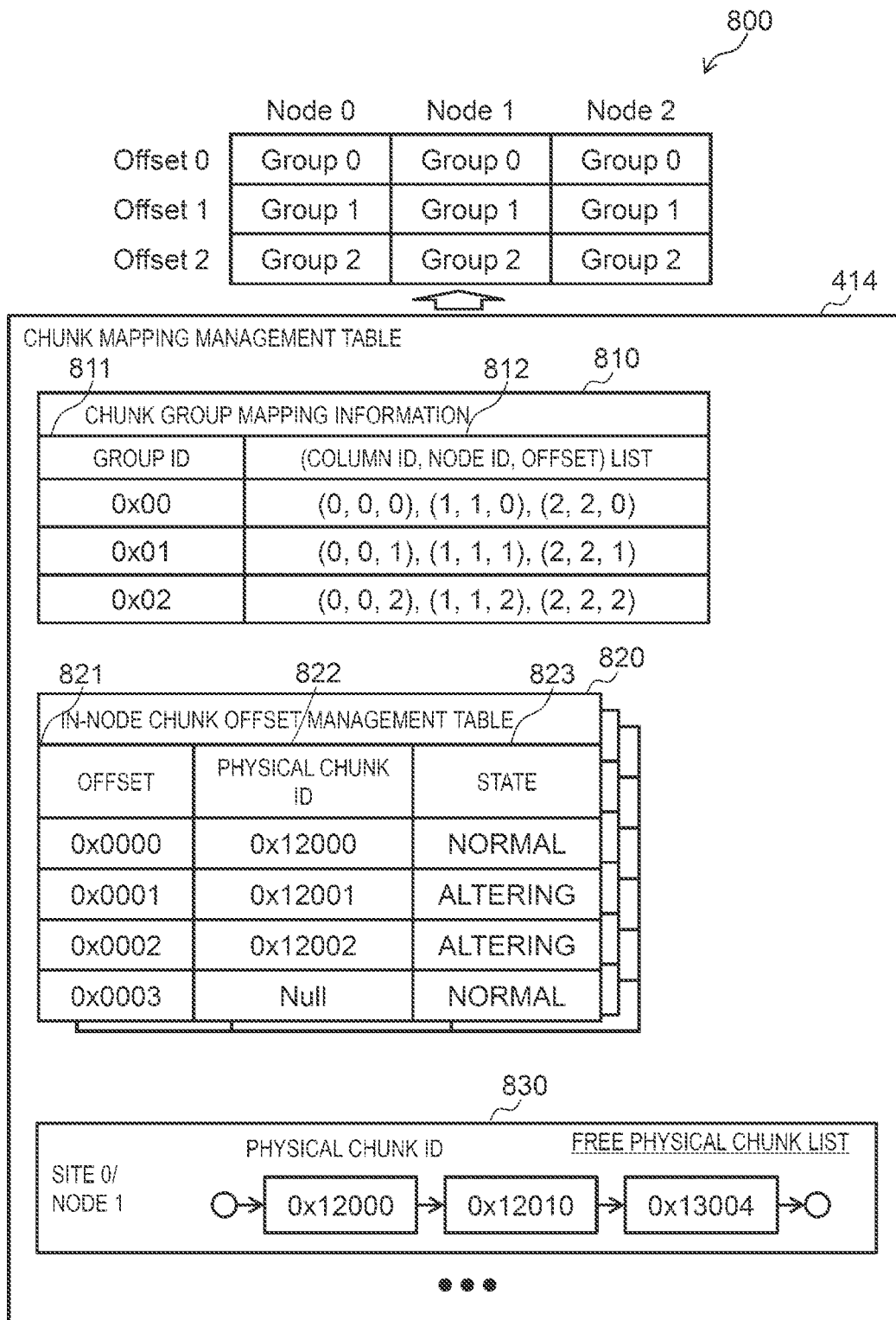
FIG. 8 is a diagram showing an example of a chunk mapping management table according to the first embodiment.

FIG. 8 is a diagram showing an example of the chunk mapping management table 414.

In FIG. 8, a concept of the chunk mapping management table 414 is shown as an image 800. As shown in image 800, three chunk groups 302 ("Group 0", "Group 1", and "Group 2") are shown to be collectively mapping changed. For example, it can be seen that the node 100 of "node 0" is arranged in a first column (column 0), the node 100 of "node 1" is arranged in a second column (column 1), and the node 100 of "node 2" is arranged in a third column (column 2). Also, it can be seen that all chunk groups 302 of "Group 0" are set to a first offset (Offset 0), all chunk groups 302 of "Group 1" are set to a second offset (Offset 1), and all chunk groups 302 of "Group 2" are set to a third offset (Offset 2). In other words, even if the data protection policy changes, the arrangement of the set chunk groups 302 (the chunk mapping management table 414) does not change.

Note that, the number of the chunk groups 302 to be collectively subjected to mapping change is not limited to three, and may be one, two, or four or more. Hereinafter, although a case where one chunk group 302 is entirely set with the same offset will be described as an example, the invention is not limited thereto. In addition, when a plurality of chunk groups 302 are provided as a processing unit of the mapping change, it is not necessary to set with the same offset, and different offsets may be set.

The chunk mapping management table 414 stores chunk mapping management information for defining a unit of the mapping change (control information and the like for determining in which combination the chunk group 302 is to be assembled with respect to the physical chunks 301 in the plurality of nodes 100). The chunk mapping management table 414 includes chunk group mapping information 810, an in-node chunk offset management table 820, and a free physical chunk list 830.

The chunk group mapping information 810 stores information in which a group ID 811 and a mapping list 812 (column ID, node ID, offset) are associated.

The group ID 811 is identification information (for example, ID) capable of identifying the chunk group 302. The mapping list 812 is information in which a column ID for specifying an array of the node 100, a node ID for specifying the node 100 arranged for each column, and an offset that indicates a relative position of the chunk group 302 are associated.

Note that, the chunk group mapping information 810 is merely an example, and is calculated in accordance with the configuration of the site 210 and the configuration of the node 100.

The in-node chunk offset management table 820 stores information for specifying the position of the physical chunk 301 in the node 100. The in-node chunk offset management table 820 is managed for each node 100 in accordance with the configuration of the drive 213.

More specifically, the in-node chunk offset management table 820 stores information in which an offset 821, a physical chunk ID 822, and a state 823 are associated. The offset 821 is information indicating a position of the physical chunk 301 allocated to the chunk group 302. The physical chunk ID 822 is identification information (for example, ID) capable of identifying the physical chunk 301 allocated to the chunk group 302. The state 823 is information indicating the state (NORMAL, ALTERING, and the like) of the physical chunk 301 allocated to the chunk group 302.

The free physical chunk list 830 is a list of identification information (for example, ID) capable of identifying the physical chunk 301 that is not allocated to the chunk group 302 among the physical chunks 301 of the drive 213 in the node 100. In the free physical chunk list 830, the physical chunks 301 are arranged from a physical chunk 301 at the beginning of the drive 213 having a small consumption capacity. In other words, the selection of the physical chunk 301 in the node 100 is performed from the one with a small consumption capacity per drive 213.

Figure 9:
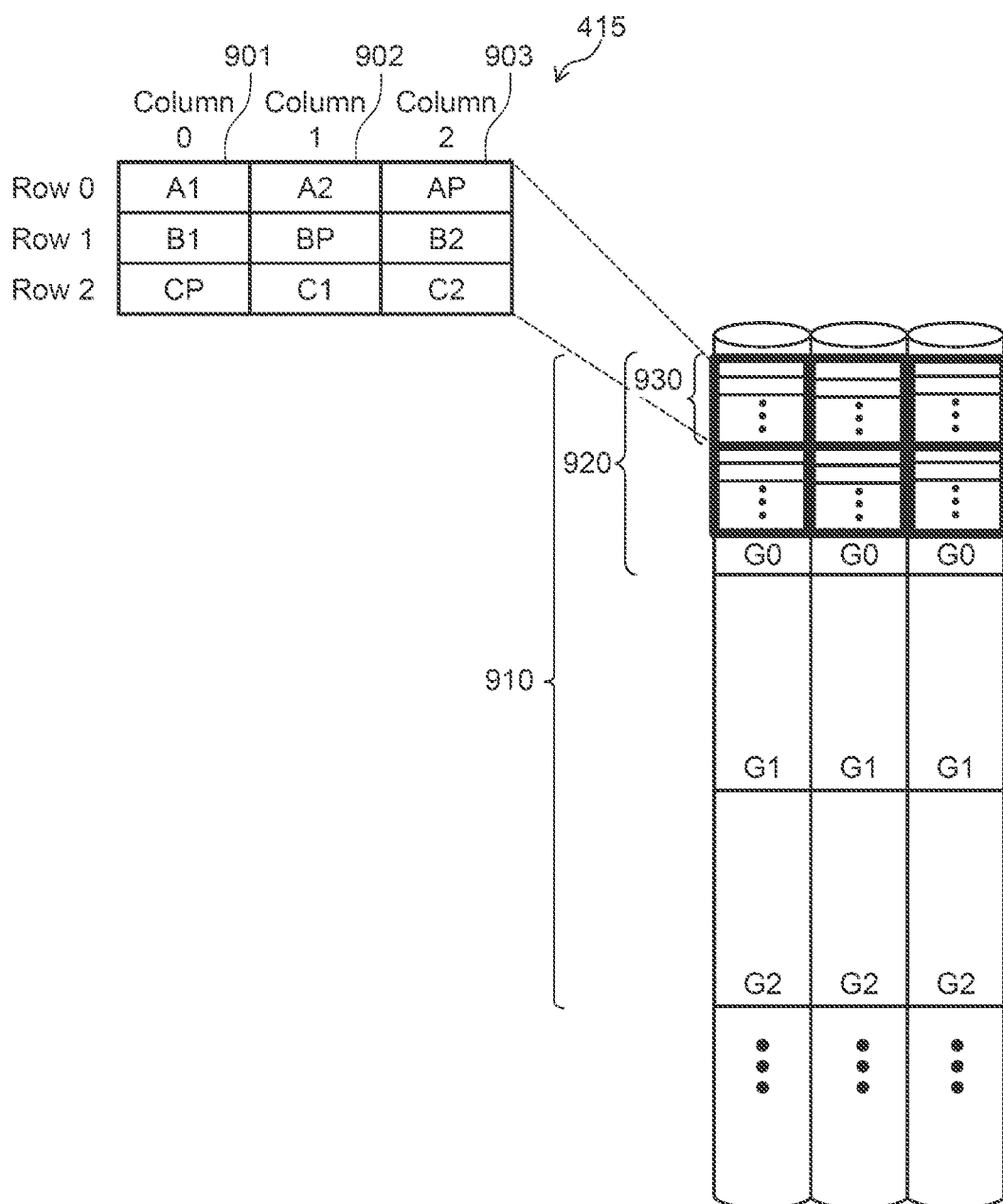
FIG. 9 is a diagram showing an example of an in-chunk-group mapping management table according to the first embodiment.

FIG. 9 is a diagram showing an example of the in-chunk-group mapping management table 415.

The in-chunk-group mapping management table 415 stores information for managing the arrangement of the data and the parity in the chunk group 302. More specifically, the in-chunk-group mapping management table 415 stores information indicating which of the data and the parity of the chunk group 302 is stored in each segment (element) identified by the Column and the Row.

For example, a segment 901 "A1" identified by "Column 0" and "Row 0" shows that data of "Group A" is stored in the chunk group 302. The segment 902 "A2" identified by "Column 1" and "Row 0" shows that the data of the "Group A" is stored in the chunk group 302. The segment 903 "AP" identified by "Column 3" and "Row 0" shows that the parity of the "Group A" is stored in the chunk group 302. A combination of the segment 901 "A1", the segment 902 "A2", and the segment 903 "AP" showing the chunk group 302 "Group A" is referred to as a "stripe" as appropriate.

Here, as shown in the configuration unit 910, the unit of the mapping change processing is referred to as a "frame". As shown in the configuration unit 920, when one offset is constituted by one chunk group 302, a unit showing the one offset is referred to as a "chunk". As shown in the configuration unit 930, when one offset is constituted by one chunk group 302, a unit managed by the in-chunk-group mapping management table 415 is referred to as a "cycle".

Further, the in-chunk-group mapping management table 415 shows an example of a case where the data protection policy is "2D1P", and when the data protection policy changes, the content of the in-chunk-group mapping management table 415 is changed.

Further, it is preferable that the in-chunk-group mapping management table 415 is set such that, when the data protection policy is mDnP, a storage ratio of data to parity per physical chunk 301 in a certain chunk group 302 is data:parity=m:n. Since the parity is frequently updated, if the parity is stored in a certain node 100 in a biased manner, the load on the node 100 may be biased. However, by determining the storage ratio as described above, the load on each node 100 can be made uniform.

Here, the in-chunk-group mapping management table 415 is used to specify a physical LBA (redundancy destination) of the parity area with respect to the physical LBA of a certain data area. As a method of specifying the redundancy destination, for example, the following method can be used.

Numbering the column ID=0 from the beginning of the list of chunk group mapping information 810

Obtaining a corresponding column ID from a group ID and a node ID of an access destination Calculating Row from the LBA of the access destination Row ID=LBA mod $Row_{max}$ ($Row_{max}$ is in the in-chunk-group mapping management table 415)

Obtaining Row and Column on the corresponding xP (parity side) if Row and Column on the data side can be identified Calculating a node ID and a physical LBA on the parity side $LBA_p = LBA_d + S_{size} \times Row\ ID$ ($S_{size}$ is the size of the segment)

Note that, a method of specifying the data position from the parity position in data restoration processing is the reverse procedure described above.

Figure 10:
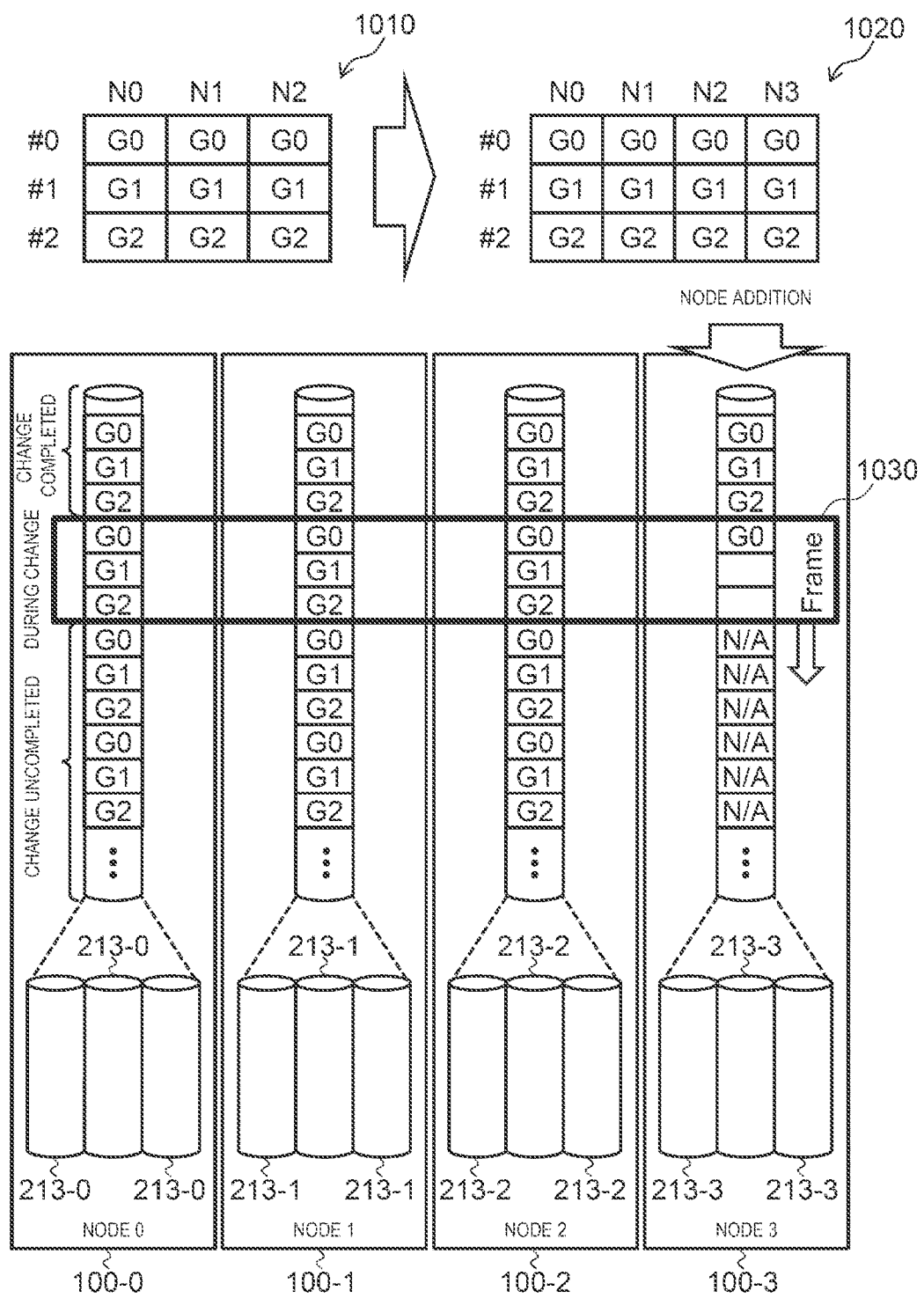
FIG. 10 is an image diagram showing an outline of a mapping change according to the first embodiment.

FIG. 10 is an image diagram showing an outline of the mapping change. Here, as shown in a chunk mapping management information 1010 before the configuration change and a chunk mapping management information 1020 after the configuration change, a case where the node 100 of "N3" (node 100-3) is added (node addition) will be described as an example.

In the chunk mapping management information 1020, a group "G0" of the chunk group 302 is set to the offset "#0", a group "G1" is set to the offset "#1", and a group "G2" is set to the offset "#2" with respect to the node 100 of "N3".

The in-chunk-group mapping management table 415 is created (changed) so that the data and the parity are not biased in each node 100 of each chunk group 302. In other words, even after the configuration change, the storage ratio of the data to the parity in each node 100 is uniform in accordance with the mDnP (the data or the parity is not biased for each node 100).

In the mapping change, a mapping change request is transmitted from the management program 101 to each node 100 in units of a frame 1030, and in each node 100, the physical chunks 301 allocated to the chunk group 302 are sequentially processed (data or intermediate data transfer, parity calculation, and the like) from the beginning.

Figure 11:
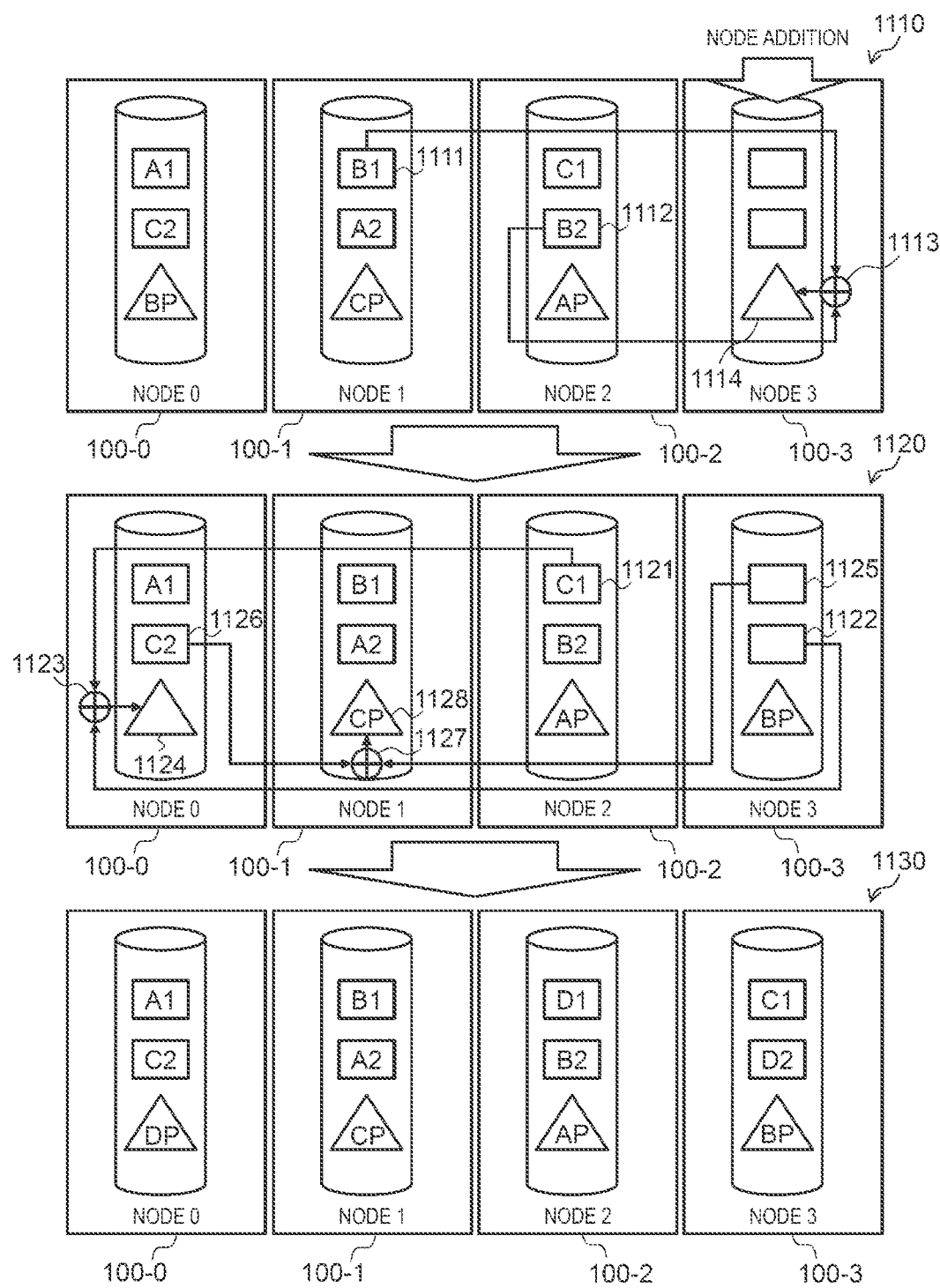
FIG. 11 is an image diagram showing a characteristic configuration of the mapping change according to the first embodiment.

FIG. 11 is an image diagram showing a characteristic configuration (outline of operation in a frame) of the mapping change. Here, one cycle of one chunk will be described as an example.

When the node 100 is added, the data is not moved between the nodes 100, the parity is rearranged, and a stripe including the added node 100 is rearranged. At this time, for example, the in-chunk-group mapping management table 415 is changed so that the data and the parity are not biased, and the mapping change is performed in accordance with the changed in-chunk-group mapping management table 415.

Main processing of the mapping change is as follows.

<Processing A>

Parity of a part of the existing nodes 100 is reconstructed to the added node 100.

<Processing B>

Parity of a new stripe is generated.

<Processing C>

Parity is generated for a stripe in which a combination of data changes in existing stripes.

In the present example, a state before mapping change and the processing A are shown as an image 1110, the processing B and the processing C are shown as an image 1120, and a state after mapping change is shown as an image 1130. In the present example, "A1-A2-AP", "B1-B2-BP" and "C1-C2-CP" indicate existing stripes, and "D1-D2-DP" indicates a new stripe.

As can be seen from the comparison between the image 1110 and the image 1130, among the existing stripes, "B1-B2-BP" is a stripe (movement stripe) in which a storage position of the parity is changed, and "C1-C2-CP" is a stripe (change stripe) in which a combination of data is changed.

Note that, "A1, A2, B1, B2, C1, C2, D1, D2" indicate segments for storing data, and "AP, BP, CP, DP" indicate segments for storing parity.

In the image 1110, the storage system 1 reconstructs the parity of "BP" in the existing "node 0" into the added "node 3" (here, an exclusive OR (XOR) 1113 of "B1" data 1111 and "B2" data 1112 is calculated and stored as the "BP" parity 1114), and provides an empty area in the existing "node 0" based on the image 1130.

In the image 1120, the storage system 1 calculates, based on the image 1130, an XOR 1123 of "D1" data 1121 ("C1"

data 1121 stored in the "node 2") and "D2" data 1122 that constitute the new stripe and generates "DP" parity 1124 in the provided empty area.

Further, in the image 1120, for "C1-C2-CP" whose data combination is changed in the existing stripe, the storage system 1 calculates, based on the image 1130, an XOR 1127 of "C1" data 1125 and "C2" data 1126 that constitute a stripe after the change and generates "CP" parity 1128 after the change.

The image 1130 shows that the parity is constructed (moved, calculated, and the like) without moving the data, thereby being rearranged in the stripe corresponding to the addition of the node 100-3.

Figure 12:
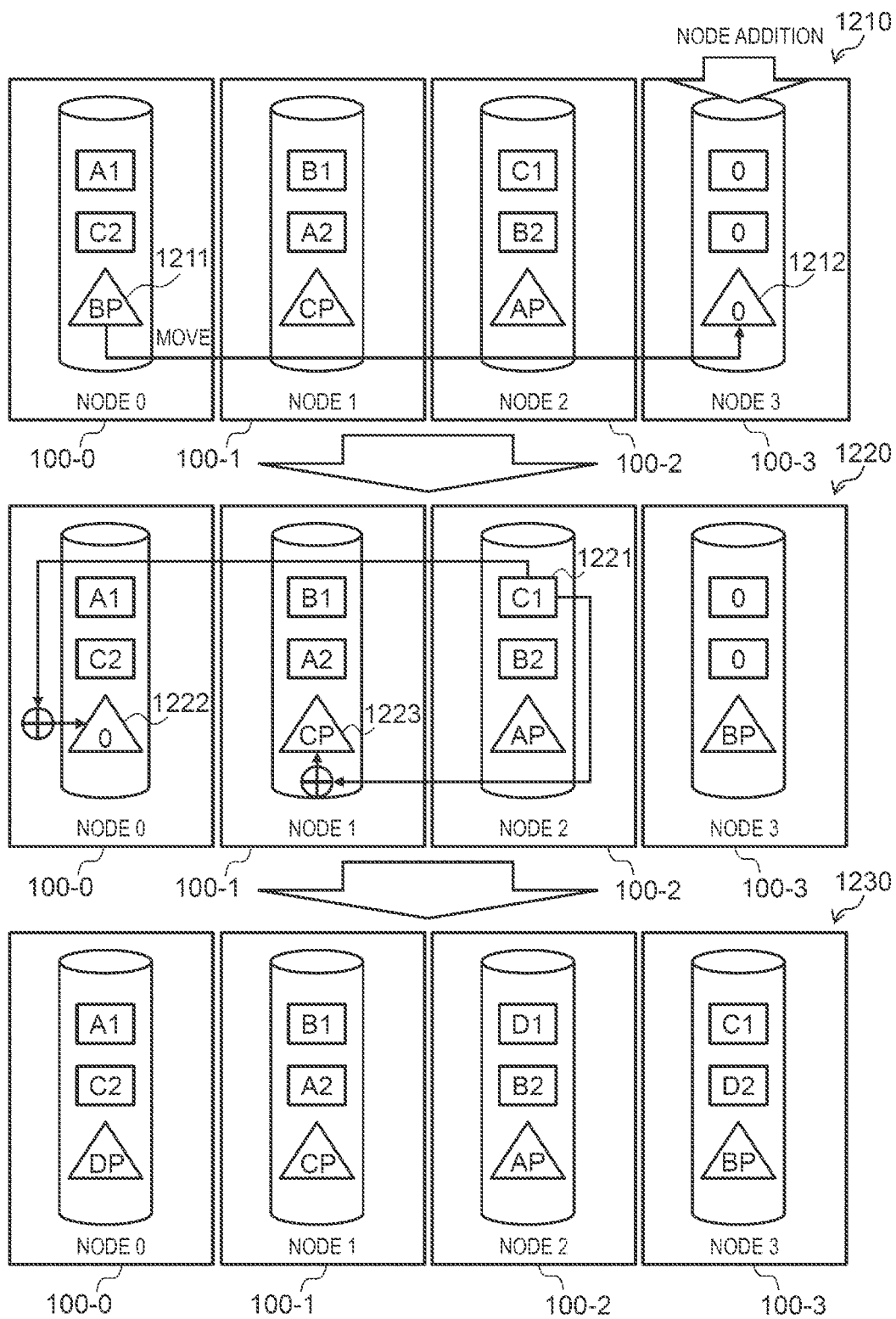
FIG. 12 is an image diagram showing a characteristic configuration of the mapping change according to the first embodiment.

FIG. 12 is an image diagram showing a characteristic configuration (outline of operation in a frame) of the mapping change. FIG. 12 is different from FIG. 11 in that optimization of data transfer between the nodes 100 is performed, which will be mainly described.

In the present example, the processing A is shown as an image 1210, the processing B and the processing C are shown as an image 1220, and a state after mapping change is shown as an image 1230.

As shown in the image 1210, the storage system 1 does not transfer data used for calculation of the existing parity 1211 to be moved to provide the empty area, and transfers the existing parity 1211 itself to be "B1-B2-BP" parity 1212. According to the transfer, it is possible to reduce the amount of transfer between the nodes 100.

As shown in the image 1220, the storage system 1 treats the data in the added node 100-3 as "0 (zero)" and transfers the "C1" data 1221 of the stripe to be changed, thereby generating a new parity 1222 and regenerates the existing parity 1223. According to the transfer, it is possible to reduce the amount of transfer between the nodes 100.

For example, the parity 1222 (new DP) is transformed and generated as follows. Since the old DP is considered as old DP=0=0 XOR 0, and the new DP is new DP=D1 (=old C1) XOR 0, when the old DP is XORed with D1, the old DP XOR D1=0 XOR D1=new DP is generated. That is, the new DP can be generated using C1 without using (transferring) D2.

For example, the parity 1223 is transformed and regenerated as follows. Since the old CP is old CP=C1 XOR C2, and the new CP is new CP=0 XOR C2, when the old CP is XORed with C1, old CP OXR C1=(C1 XOR C2) XOR C1=(C1 XOR C1) OXR C2=0 XOR C2=new CP is generated. That is, the new DP can be generated using C1 and without using (transferring) C2.

Next, processing related to the storage system 1 will be described.

Figure 13:
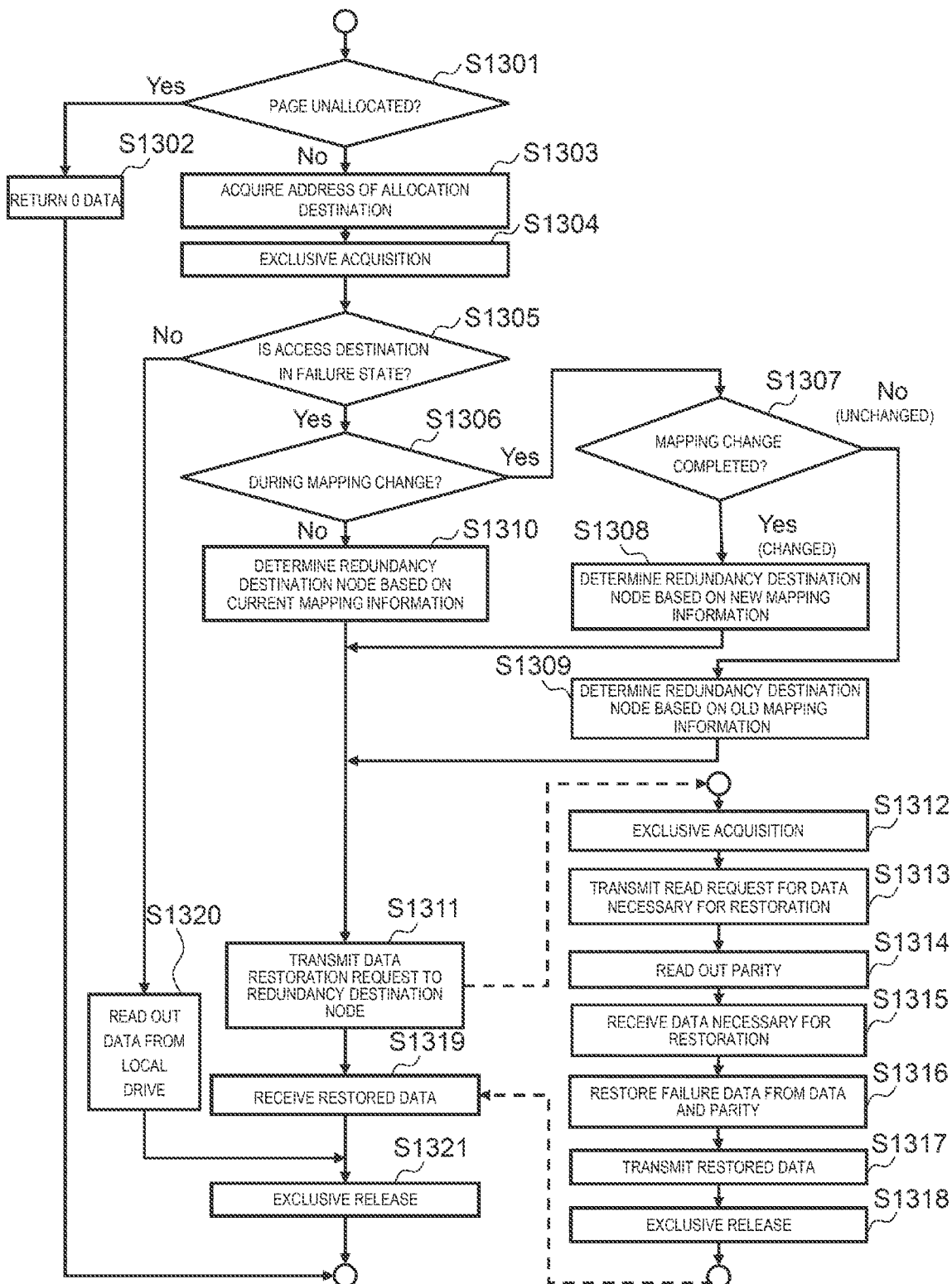
FIG. 13 is a diagram showing an example of a flowchart related to a read processing according to the first embodiment.

FIG. 13 is a diagram showing an example of a flowchart related to a read processing. In the read processing, data is read out from the drive 213 of the own node 100 in response to a read request from the application 311. When an area of the access destination (drive 213) is in the failure state, data to be read is restored from redundant data so as to respond the request. In the restoration processing during the mapping change, whether the in-chunk-group mapping management table 415 (hereinafter, referred to as mapping information as appropriate.) is new (mapping information after the configuration change) or old (mapping information before the configuration change) is determined, and a redundant data position to be restored is determined. Details will be described below.

In step S1301, the read processing unit 431 determines whether or not the page 307 is unallocated to the storage pool 305 for the data under the read request. When the read processing unit 431 determines that the page is unallocated, the process is moved to step S1302, and when determines that the page is not unallocated, the process is moved to step S1303.

In step S1302, the read processing unit 431 returns 0 data indicating that there is no data to the host node 300, and ends the read processing.

In step S1303, the read processing unit 431 acquires an address of an allocation destination.

In step S1304, the read processing unit 431 performs exclusive acquisition. In the exclusive acquisition, an access destination Logical Block Addressing (LBA) is controlled so that a plurality of processing does not simultaneously access the same area by using an exclusive algorithm such as mutex. The same processing is performed for the subsequent exclusive processing.

In step S1305, the read processing unit 431 determines whether or not the access destination which is the drive 213 is in the failure state. When the read processing unit 431 determines that the access destination is in the failure state, the process is moved to step S1306, and when determines that the access destination is not in the failure state, the process is moved to step S1320.

In step S1306, the read processing unit 431 determines whether or not the mapping is being changed. When the read processing unit 431 determines that the mapping is being changed, the process is moved to step S1307, and when determines that the mapping is not being changed, the process is moved to step S1310. For example, the read processing unit 431 confirms the in-node chunk offset management table 820 in the chunk mapping management table 414, and determines that the mapping is being changed when "ALTERING" is being updated.

In step S1307, the read processing unit 431 determines whether or not the mapping change is completed for the data under the read request. When the read processing unit 431 determines that the change is completed, the process is moved to step S1308, and when determines that the change is not completed, the process is moved to step S1309. For example, when the read processing unit 431 confirms the mapping change progress information 724 of the chunk group management table 720 in the node 100, and determines that the mapping change is completed when it is "LBA of the access destination<progress information".

In step S1308, the read processing unit 431 determines a node 100 (redundancy destination node) which is the redundancy destination that stores the parity of the data under the read request based on the mapping information after the change (new mapping information). In the following description, it is assumed that the node 100 that stores the parity of the data under the read request is determined as the redundancy destination node 100.

In step S1309, the read processing unit 431 determines the redundancy destination node 100 based on the mapping information before the change (old mapping information).

In step S1310, the read processing unit 431 determines the redundancy destination node 100 based on the current mapping information.

In step S1311, the read processing unit 431 transmits a request (data restoration request) to restore data to the determined redundancy destination node 100.

In step S1312, the read processing unit 431 (redundancy destination read processing unit) of the redundancy destination node 100 performs exclusive acquisition.

In step S1313, the redundancy destination read processing unit transmits a read request for data necessary for restoration. Although not shown, communication between the nodes 100 is generated, and the data is read out from other node 100 that stores data assembling the same stripe as the data necessary for restoration.

In step S1314, the redundancy destination read processing unit reads the parity necessary for restoration.

In step S1315, the redundancy destination read processing unit receives data necessary for restoration.

In step S1316, the redundancy destination read processing unit restores failure data from the data and the parity.

In step S1317, the redundancy destination read processing unit transmits the restored data.

In step S1318, the redundancy destination read processing unit performs exclusive release.

In step S1319, the read processing unit 431 receives the restored data.

In step S1320, the read processing unit 431 reads out data from the drive 213 (local drive) of the own node 100.

In step S1321, the read processing unit 431 performs exclusive release, and ends the read processing.

Figure 14:
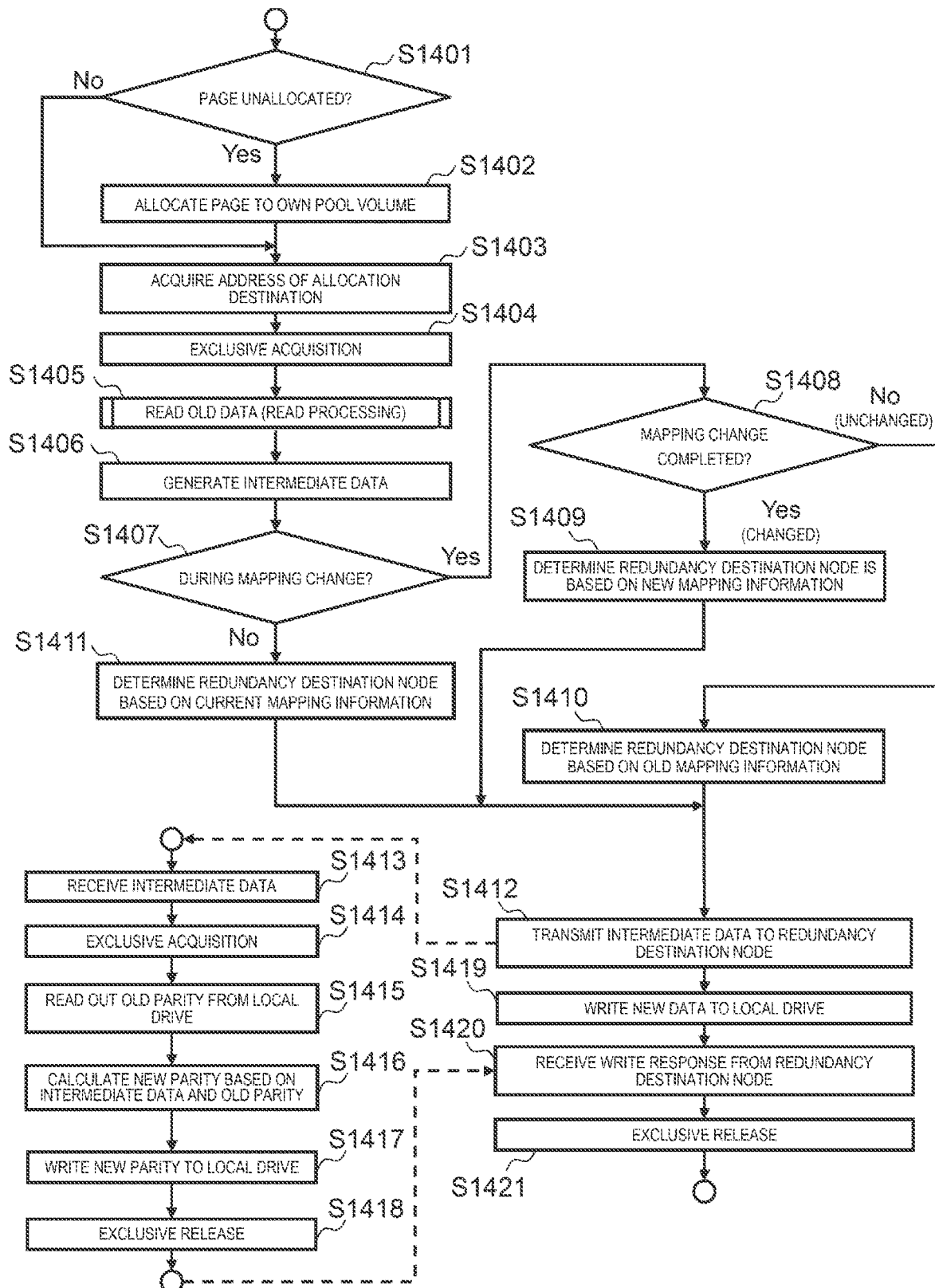
FIG. 14 is a diagram showing an example of a flowchart related to a write processing according to the first embodiment.

FIG. 14 is a diagram showing an example of a flowchart related to a write processing. In the write processing, in response to a write request from the application 311, data is written to the drive 213 of the own node 100, and redundant data (parity) is written to the drive 213 of other node 100. When the mapping is being changed, a redundancy destination is determined after it is determined whether it is new or old. Details will be described below.

In step S1401, the write processing unit 432 determines whether or not the page 307 is unallocated to the storage pool 305 for the data under the read request. When the write processing unit 432 determines that the page is unallocated, the process is moved to step S1402, and when determines that the page is not unallocated, the process is moved to step S1403.

In step S1402, the write processing unit 432 allocates the page 307 to the volume 304 (own volume) to which the physical chunk 301 of the drive 213 of the own node 100 is associated.

In step S1403, the write processing unit 432 acquires an address of the allocation destination.

In step S1404, the write processing unit 432 performs exclusive acquisition.

In step S1405, the write processing unit 432 reads the data before writing (old data) (more specifically, performs the read processing shown in FIG. 13 for the old data).

In step S1406, the write processing unit 432 generates intermediate data. The intermediate data is temporary data created when the data is partially updated, and is data indicating a difference between the new and old data. For example, when the stripe of the old data is "A1-A2-AP", the intermediate data is obtained as follows.
AP (old parity)=A1 (old data) XOR A2 (old data)
A1 (new data) XOR A1 (old data)=M (intermediate data)
The new parity is obtained as follows.
AP (old parity) XOR M (intermediate data)=AP (new parity)

In step S1407, the write processing unit 432 determines whether or not the mapping is being changed. When the write processing unit 432 determines that the mapping is being changed, the process is moved to step S1408, and when determines that the mapping is not being changed, the process is moved to step S1411. The determination method is the same as that in step S1306, and a description thereof will be omitted.

In step S1408, the write processing unit 432 determines whether or not the mapping change is completed for the data under the write request. When the write processing unit 432 determines that the change is completed, the process is moved to step S1409, and when determines that the change is not completed, the process is moved to step S1410. The determination method is the same as that in step S1307, and a description thereof will be omitted.

In step S1409, the write processing unit 432 determines the redundancy destination node 100 based on new mapping information. In the following description, it is assumed that the node 100 that stores the parity of the data under the write request is determined as the redundancy destination node 100.

In step S1410, the write processing unit 432 determines the redundancy destination node 100 based on old mapping information.

In step S1411, the write processing unit 432 determines the redundancy destination node 100 based on the current mapping information.

In step S1412, the write processing unit 432 transmits the intermediate data to the determined redundancy destination node 100. The write processing unit 432 transfers the intermediate data in accordance with a degree of redundancy (to two or more nodes 100 when the degree of redundancy is 2 or more).

In step S1413, the write processing unit 432 of the redundancy destination node 100 (redundancy destination write processing unit) receives the intermediate data.

In step S1414, the redundancy destination write processing unit performs exclusive acquisition.

In step S1415, the redundancy destination write processing unit reads out the old parity from the drive 213 (local drive) of the own node 100.

In step S1416, the redundancy destination write processing unit calculates a new parity based on the intermediate data and the old parity.

In step S1417, the redundancy destination write processing unit writes the new parity to the local drive.

In step S1418, the redundancy destination write processing unit performs exclusive release.

In step S1419, the write processing unit 432 writes the data under the write request (new data) to the local drive.

In step S1420, the write processing unit 432 receives a write response from the redundancy destination node 100.

In step S1421, the write processing unit 432 performs exclusive release, and ends the write processing.

Figure 15:
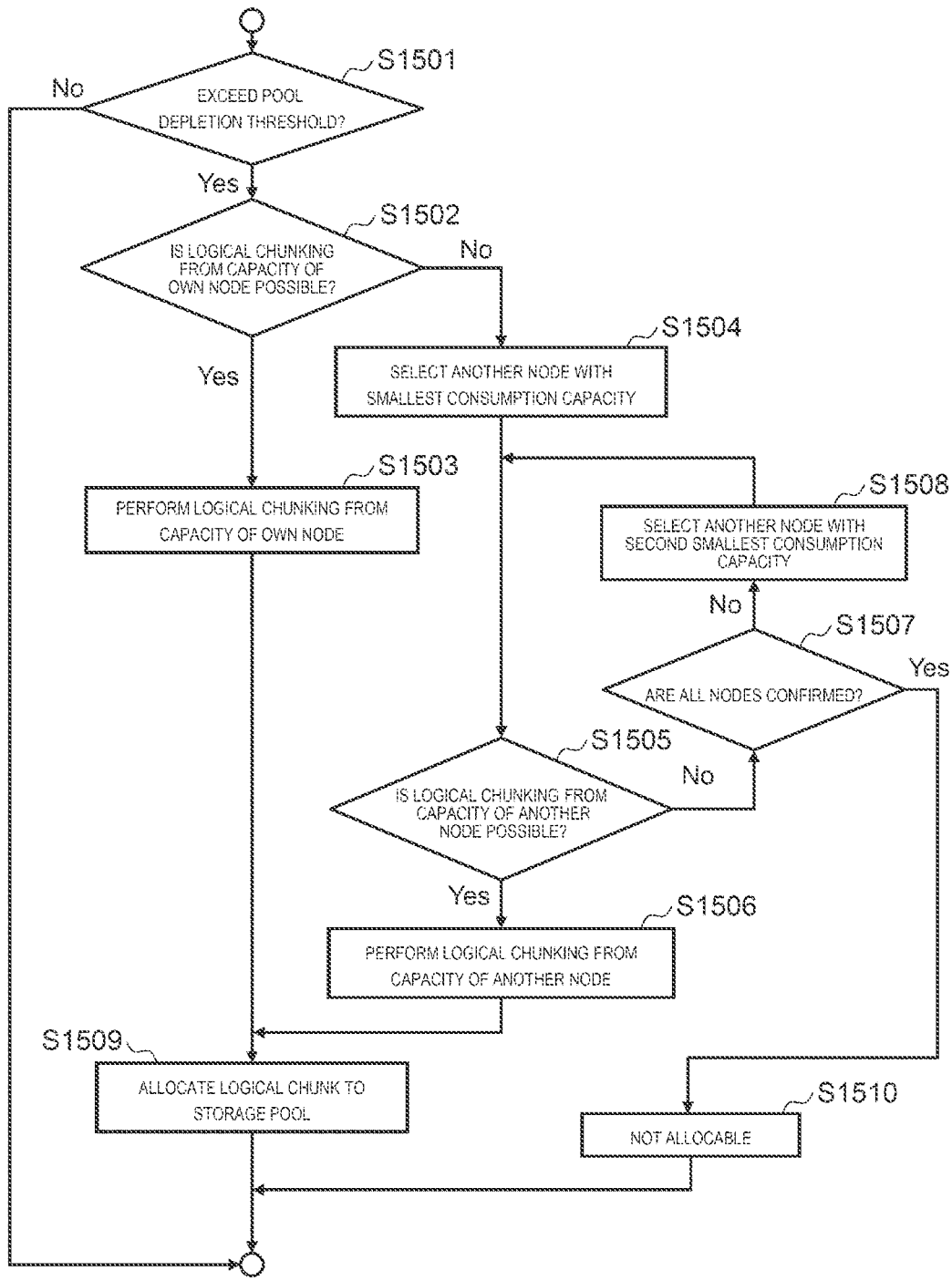
FIG. 15 is a diagram showing an example of a flowchart related to a storage pool expansion processing according to the first embodiment.

FIG. 15 is a diagram showing an example of a flowchart related to a storage pool expansion processing (logical chunk allocation processing). In the storage pool expansion processing, when a depletion threshold of the storage pool 305 is reached, the logical chunk 303 is allocated to the storage pool 305 to expand the pool size. The storage pool expansion processing may be executed periodically, or may be executed every time after the write processing. It is preferable that the group to be logically chunked is determined so that the load and the used capacity between the nodes 100 are equal.

In step S1501, the logical chunk allocation processing unit 422 confirms the storage pool information table 610 of the storage pool configuration management table 412, and determines whether the consumption capacity 613 with respect to the total capacity 612 exceeds the depletion threshold 614 (pool depletion threshold) of the storage pool 305. When the logical chunk allocation processing unit 422 determines that the depletion threshold is exceeded, the process is moved to step S1502, and when determines that the depletion threshold is not exceeded, the storage pool expansion processing is ended.

In step S1502, the logical chunk allocation processing unit 422 determines whether or not the logical chunk 303 can be cut out (logically chunked from the capacity of the own node) from the physical chunk 301 of the drive 213 of the own node 100. When the logical chunk allocation processing unit 422 determines that the cut can be performed, the process is moved to step S1503, and when determines that the cut cannot be performed, the process is moved to step S1504. For example, the logical chunk allocation processing unit 422 determines that the cut can be performed when the free physical chunk list 830 of the node 100 whose capacity is to be allocated is not empty.

In step S1503, the logical chunk allocation processing unit 422 performs logical chunking from the capacity of the own node. For example, the logical chunk allocation processing unit 422 first acquires the physical chunk 301 from the free physical chunk list 830 of the own node, and registers the physical chunk 301 in an unallocated offset of the in-node chunk offset management table 820 of the own node. Next, the logical chunk allocation processing unit 422 refers to the chunk group mapping information from the in-node offset of the allocated own node, and specifies the node number and the offset of other nodes constituting the chunk group. Next, the logical chunk allocation processing unit 422 acquires the physical chunk 301 from the free physical chunk list 830 of the specified other nodes, and registers the physical chunk 301 in the specified in-node chunk offset management table 820. Next, the logical chunk allocation processing unit 422 registers the chunk group information and the logical chunk information in the chunk configuration management table 413.

In step S1504, the logical chunk allocation processing unit 422 selects another node 100 (other node) having the smallest consumption capacity.

In step S1505, the logical chunk allocation processing unit 422 determines whether or not logical chunking is possible from the capacity of the other node. When the logical chunk allocation processing unit 422 determines that the logical chunking is possible, the process is moved to step S1506, and when determines that the logical chunking is not possible, the process is moved to step S1507.

In step S1506, the logical chunk allocation processing unit 422 performs logical chunking from the capacity of the selected other node, and the process is moved to step S1509. The processing of creating the logical chunk using the capacity of the other node is omitted since the procedure is the same as described in step S1503 with only the own node being replaced with other node.

In step S1507, the logical chunk allocation processing unit 422 determines whether or not all nodes 100 are confirmed (whether or not the confirmation is completed). When the logical chunk allocation processing unit 422 determines that all nodes are confirmed, the process is moved to step S1510, and when determines that not all of the nodes are confirmed, the process is moved to step S1508.

In step S1508, the logical chunk allocation processing unit 422 selects another node with second smallest consumption capacity and the process is moved to step S1505.

In step S1509, the logical chunk allocation processing unit 422 allocates the logical chunk 303 to the storage pool 305, and the storage pool expansion processing is ended.

In step S1510, the logical chunk allocation processing unit 422 ends the storage pool expansion processing as being unable to be allocated (not allocable).

The logical chunk 303 is dynamically allocated at the time of reaching the depletion threshold of the storage pool 305, so that the transfer cost between the nodes 100 at the time of mapping change can be reduced.

Figure 16:
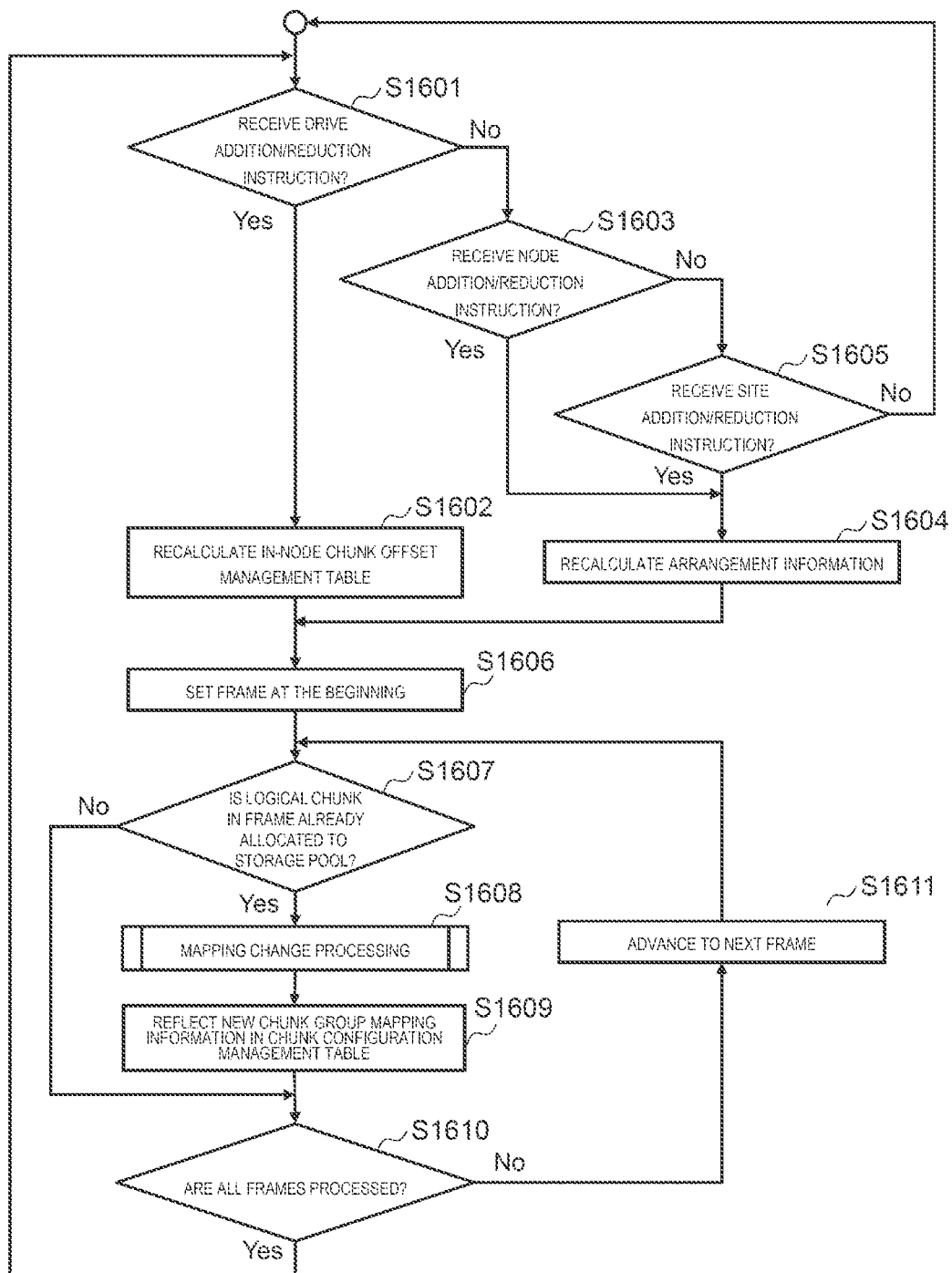
FIG. 16 is a diagram showing an example of a flowchart related to a configuration change processing according to the first embodiment.

FIG. 16 is a diagram showing an example of a flowchart related to a configuration change processing. In the configuration change processing, a mapping change request is issued to each node 100 in units of frames based on a configuration change instruction. The configuration change processing is executed in the management program 101. The execution may be executed periodically, or may be executed in response to an operation reception from a user. In addition, when there is a node failure or drive failure or the like with a degree of redundancy (p) or less, the change processing is continued (roll forward), and then the failure site is replaced to return to the normal state. The change processing is stopped when a failure with a degree of redundancy or more occurs. With respect to the failure site, the access continues by the collection access, and the mapping change processing is continued.

In step S1601, the addition/reduction management processing unit 421 determines whether or not an instruction to add or reduce the drive 213 (drive addition/reduction instruction) is received. When the addition/reduction management processing unit 421 determines that the instruction is received, the process is moved to step S1602, and when determines that the instruction is not received, the process is moved to step S1603.

In step S1602, the addition/reduction management processing unit 421 recalculates the in-node chunk offset management table 820. When the drive 213 is added or reduced, the addition/reduction management processing unit 421 changes the physical chunk 301 to be allocated to the chunk offset in the node 100, and changes the configuration by moving the data and the parity in the node 100 between the drives 213 (data movement). At this time, for example, the addition/reduction management processing unit 421 may change the allocation and move data so that the capacity of each drive 213 is made uniform, or may change the allocation and move the data so that an IO load of each drive 213 is made uniform. When the drive 213 is added, the addition/reduction management processing unit 421 may add to the free physical chunk list 830 without changing the allocation of the in-node chunk offset management table 820.

In step S1603, the addition/reduction management processing unit 421 determines whether or not an instruction to add or reduce the node 100 is received (node addition/reduction instruction). When the addition/reduction management processing unit 421 determines that the instruction is received, the process is moved to step S1604, and when determines that the instruction is not received, the process is moved to step S1605.

In step S1604, the addition/reduction management processing unit 421 recalculates the arrangement information, and the process is moved to step S1606. For example, the addition/reduction management processing unit 421 generates, in accordance with the change in the configuration, new arrangement information (for example, the chunk mapping management table 414 and the in-chunk-group mapping management table 415) for changing the stripe so that the data does not move to other nodes 100. The recalculated arrangement information is transmitted to each node 100 at an appropriate timing.

In step S1605, the addition/reduction management processing unit 421 determines whether or not an instruction to add or reduce the site 210 (a site addition/reduction instruction) is received. When the addition/reduction management processing unit 421 determines that the instruction is received, the process is moved to step S1604, and when determines that the instruction is not received, the process is moved to step S1601.

In step S1606, the addition/reduction management processing unit 421 sets a frame at the beginning as the frame to be subjected to the mapping change.

In step S1607, the addition/reduction management processing unit 421 determines whether or not the logical chunk 303 in the frame is already allocated to the storage pool 305. When the addition/reduction management processing unit 421 determines that the allocation is completed, the process is moved to step S1608, and when determines that the allocation is not completed, the process is moved to step S1610.

In this way, by targeting only the area allocated to the storage pool 305, the transfer cost between the nodes 100 at the time of configuration change can be reduced.

In step S1608, the addition/reduction management processing unit 421 performs mapping change processing. In the mapping change processing, a mapping change request is transmitted to each node 100. The mapping change processing will be described later with reference to FIGS. 17 and 18.

In step S1609, the addition/reduction management processing unit 421 reflects new chunk group mapping information 810 in the chunk configuration management table 413.

In step S1610, the addition/reduction management processing unit 421 determines whether or not the processing is completed for all frames. When the addition/reduction management processing unit 421 determines that the processing is completed, the process is moved to step S1601, and when determines that the processing is not completed, the process is moved to step S1611.

In step S1611, the addition/reduction management processing unit 421 advances the frame to be subjected to the mapping change to the next frame, and the process is moved to step S1607.

Figure 17:
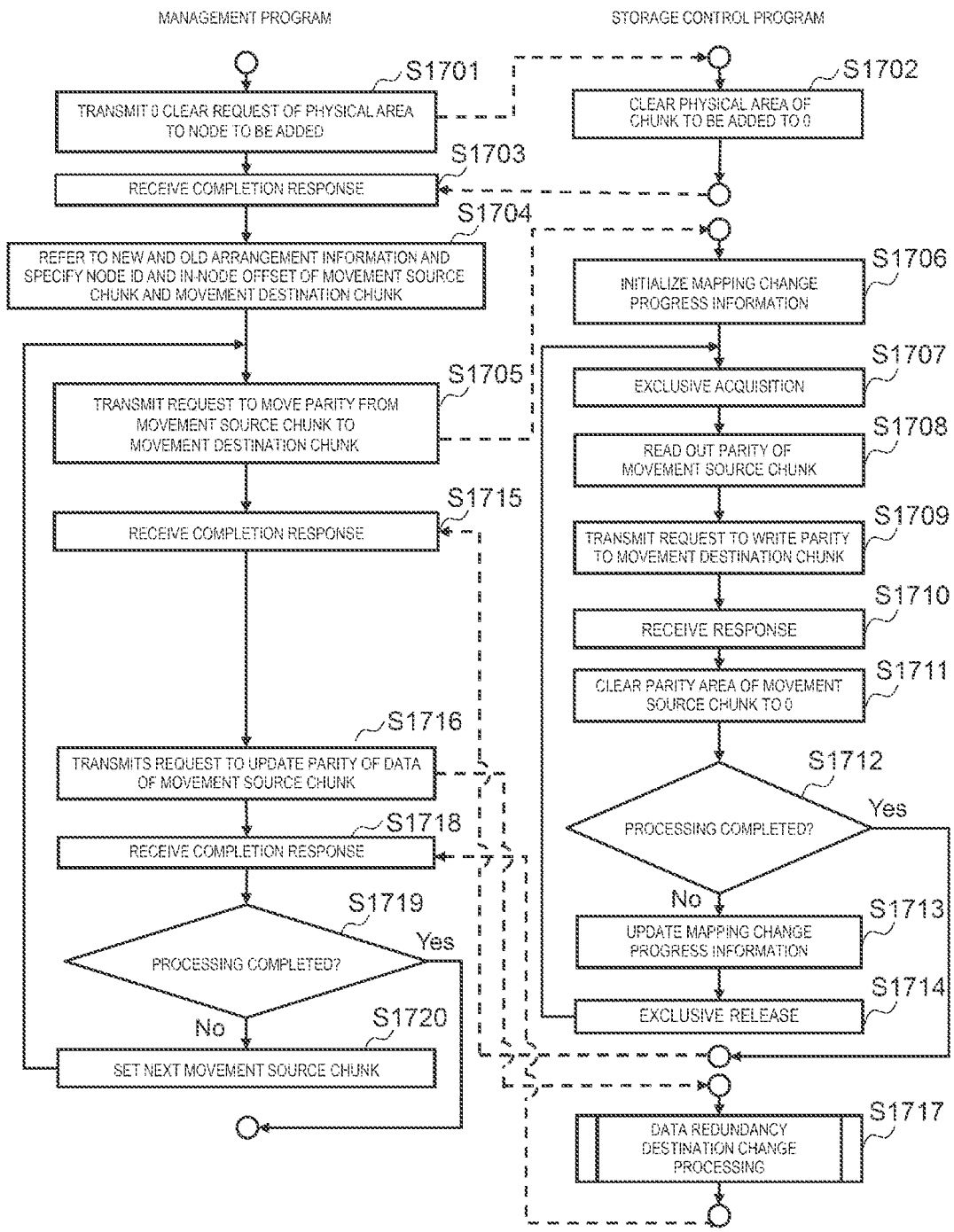
FIG. 17 is a diagram showing an example of a flowchart related to a mapping change processing according to the first embodiment.

FIG. 17 is a diagram showing an example of a flowchart related to a mapping change processing. In the mapping change processing, a case where the execution is performed on one chunk when an instruction to add the node 100 is received will be described as an example. The processing on the management program 101 side is called as extension of the configuration change processing, and the processing on the storage control program 102 side is executed by the storage control unit 430 on each node 100. Note that, the mapping change processing shown in FIG. 17 is exemplified for the processing in the optimized method shown in FIG. 12.

In step S1701, the addition/reduction management processing unit 421 of the management program 101 transmits a 0 clear request of the physical area to the node 100 to be added.

In step S1702, the mapping change processing unit 433 of the node 100 that has received the 0 clear request clears the physical area to be added to 0. Here, 0 clear (0 data) of the physical area may actually write "0" or may manage the state of "0" in the bit.

In step S1703, the addition/reduction management processing unit 421 receives a completion response.

In step S1704, the addition/reduction management processing unit 421 refers to the new and old arrangement information, and specifies the node ID and the in-node offset of a physical chunk 301 which is the movement source (movement source chunk) and a physical chunk 301 which is the movement destination (movement destination chunk).

For example, in the example shown in FIG. 10, it is determined that the arrangement of the group 0 (G0), the group 1 (G1), and the group 2 (G2) is changed by referring to the arrangement information before and after the mapping change. Further, in the example shown in FIG. 23 to be described later, it is determined that the arrangement of the group 1 (G1), the group 2 (G2), and the group 3 (G3) is changed. In the example shown in FIG. 23, since the arrangement for the group 0 (G0) is not changed, the group 0 (G0) is excluded from the physical chunk to be moved.

In step S1705, the addition/reduction management processing unit 421 transmits a movement request to move the parity from the movement source chunk to the movement destination chunk to the node 100 of the movement source chunk. In the present mapping change processing, although an issue location is shown as one node 100, transmission (issue) is performed to all nodes 100 to be changed in one frame. When the movement of the parity is not necessary, the processing of step S1705 is skipped.

In step S1706, the mapping change processing unit 433 of the node 100 that has received the request to move the parity initializes the mapping change progress information 724.

In step S1707, the mapping change processing unit 433 performs exclusive acquisition.

In step S1708, the mapping change processing unit 433 reads out the parity of the movement source chunk.

In step S1709, the mapping change processing unit 433 transmits a request to write the parity to the storage control program 102 of the movement destination chunk.

In step S1710, the mapping change processing unit 433 receives a response.

In step S1711, the mapping change processing unit 433 sets the parity of the read movement source chunk to "0" (clears the movement source chunk to 0).

In step S1712, the mapping change processing unit 433 determines whether or not the processing for all the areas in the physical chunk 301 is completed. When the mapping change processing unit 433 determines that the processing is completed, the processing of step S1715 is performed, and when determines that the processing is not completed, the process is moved to step S1713.

In step S1713, the mapping change processing unit 433 updates the mapping change progress information 724.

In step S1714, the mapping change processing unit 433 performs exclusive release, and the process is moved to step S1707.

In step S1715, the addition/reduction management processing unit 421 receives the completion response.

In step S1716, the addition/reduction management processing unit 421 transmits an update request to update the parity of the data of the movement source chunk. In the present mapping change processing, although the issue location is one node 100, transmission (issue) is performed to all nodes 100 to be changed in one frame. When the update of the parity is not necessary, the processing of step S1716 is skipped.

In step S1717, the mapping change processing unit 433 of the node 100 that has received the request to update the parity performs the data redundancy destination change processing. The data redundancy destination change processing will be described later with reference to FIG. 18.

In step S1718, the addition/reduction management processing unit 421 receives the completion response.

In step S1719, the addition/reduction management processing unit 421 determines whether or not the processing for all specified movement source chunks is completed. When the addition/reduction management processing unit 421 determines that the processing is completed, the mapping change processing is ended, and when determines that the processing is not completed, the process is moved to step S1720.

In step S1720, the addition/reduction management processing unit 421 sets a next movement source chunk (and the movement destination chunk), and the process is moved to step S1705.

Figure 18:
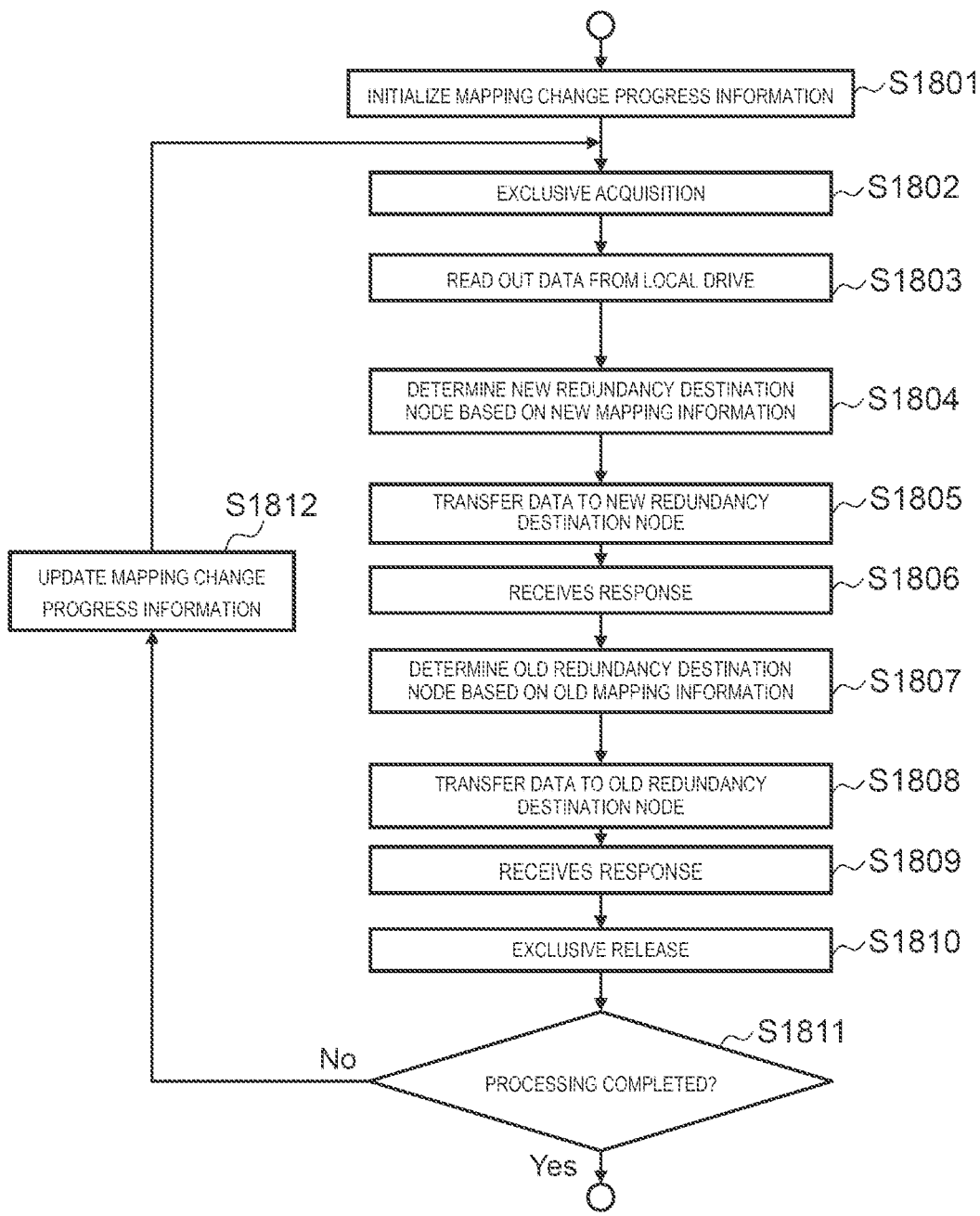
FIG. 18 is a diagram showing an example of a flowchart related to a data redundancy destination change processing according to the first embodiment.

FIG. 18 is a diagram showing an example of a flowchart related to the data redundancy destination change processing. In the data redundancy destination change processing, the parity of the redundancy destination is changed without moving the data. More specifically, data is transferred to the new redundancy destination to generate a new parity, data is transferred to the old redundancy destination to cancel the relationship with the old parity, and the parity is recalculated.

In step S1801, the mapping change processing unit 433 initializes the mapping change progress information 724.

In step S1802, the mapping change processing unit 433 performs exclusive acquisition.

In step S1803, the mapping change processing unit 433 reads out data (data for generating new parity of the movement destination chunk or data for updating the parity of the movement destination chunk) from the local drive (the drive 213 of the own node 100).

In step S1804, the mapping change processing unit 433 determines a new redundancy destination node 100 (new redundancy destination node) based on the new mapping information.

In step S1805, the mapping change processing unit 433 transfers the data to the new redundancy destination node. When the degree of redundancy is 2 or more, the data is transferred to two or more nodes 100. Further, the node 100 that has received the data updates the parity in the same processing as the write processing, and replies (responds) that the update is completed.

In step S1806, the mapping change processing unit 433 receives a response.

When the parity of a new stripe is not generated (for example, in the example shown in FIG. 12, when a node 100 of the movement source chunk is the node 100-2 and a node 100 of the movement destination chunk is the node 100-1), steps S1804 to S1806 may be skipped.

In step S1807, the mapping change processing unit 433 determines the redundancy destination node 100 before changing (old redundancy destination node) based on the old mapping information.

In step S1808, the mapping change processing unit 433 transfers the data to the old redundancy destination node. Note that, the node 100 that has received the data updates the parity in the same processing as the write processing, and replies (responds) that the update is completed.

In step S1809, the mapping change processing unit 433 receives the response.

When the parity of the change stripe is not updated (for example, in the example shown in FIG. 12, when a node 100 of the movement source chunk is the node 100-2 and a node 100 of movement destination chunk is the node 100-0), steps S1807 to S1809 may be skipped.

In step S1810, the mapping change processing unit 433 performs exclusive release.

In step S1811, the mapping change processing unit 433 determines whether or not the processing for all areas in the physical chunk 301 is completed. When the mapping change processing unit 433 determines that the processing is completed, the data redundancy destination change processing is ended, and when determines that the processing is not completed, the process is moved to step S1812.

In step S1812, the mapping change processing unit 433 updates the mapping change progress information 724, and the process is moved to step S1802.

According to the present embodiment, it is possible to add nodes, for example, without affecting the performance of the existing volume before and after the configuration change. In addition, for example, even in the EC method that holds data locality, the data locality is maintained before, during, and after the configuration change, so that the storage performance is not decreased.

(2) Second Embodiment

The present embodiment will be described in terms of two pieces of parity. In the present embodiment, the description of the same points as those in the first embodiment will be omitted as appropriate, and different points will be mainly described. Hereinafter, a case where the data protection policy is 2D2P will be described as an example.

Figure 19:
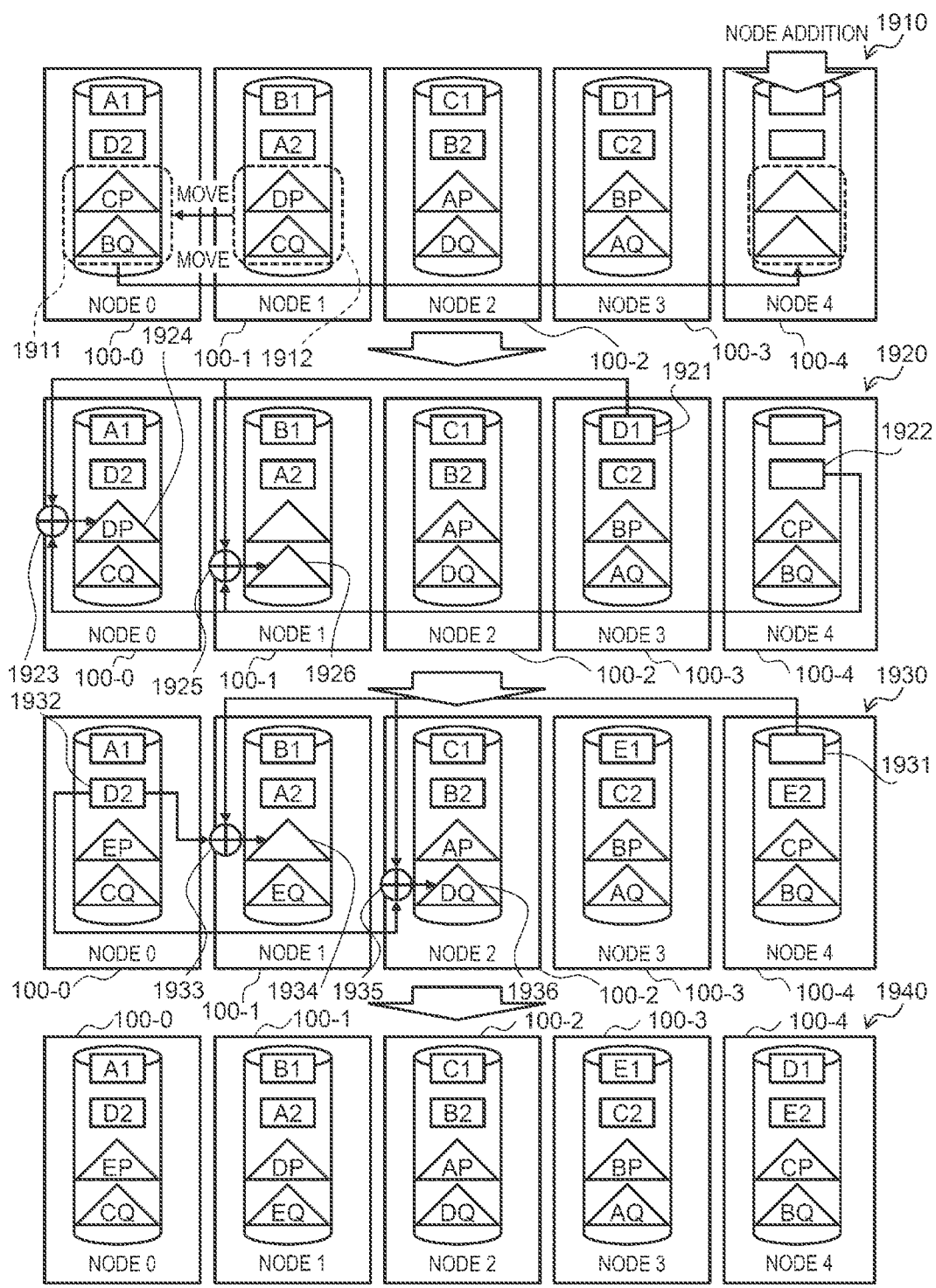
FIG. 19 is an image diagram showing a characteristic configuration of a mapping change according to a second embodiment.

FIG. 19 is an image diagram showing a characteristic configuration (outline of operation in a frame) of the mapping change.

When there are two pieces of parity, main processing of the mapping change is basically the same as that in the case where there is only one piece of parity.

<Processing A>

Parity of a part of the existing nodes 100 is reconstructed (moved or recalculated) to the added node 100.

<Processing B>

Parity of a new stripe is generated.

<Processing C>

Parity is generated for a stripe in which a combination of data changes in existing stripes.

In the present example, the processing A is shown as an image 1910, the processing B is shown as an image 1920, the processing C is shown as an image 1930, and a state after mapping change is shown as an image 1940. In the present example, "A1-A2-AP-AQ", "B1-B2-BP-BQ", "C1-C2-CP-CQ", "D1-D2-DP-DQ" indicate existing stripes, and "E1-E2-EP-EQ" indicate s a new stripe. Note that, "AQ, BQ, CQ, DQ, EQ" means second parity calculated using an algorithm such as Cauchy-Reed-Solomon or the like with respect to "AP, BP, CP, DP, EP", which are first parity calculated by a simple XOR. Even when the degree of redundancy is 3 or more, for example, third and fourth parity can be calculated using an algorithm such as Cauchy-Reed-Solomon or the like. Since the parity is calculated using the XOR for the algorithm such as Cauchy-Reed-Solomon or the like, details of a code calculation method are not mentioned and are simply described as XOR in the following description.

In the present example, it is assumed that mapping information is generated in the stripe shown in the image 1940. In other words, since the data protection policy is 2D2P, the mapping information is preferably generated so that data:parity=2:2 in each node 100.

In the image 1910, the storage system 1 reconstructs the "CP" and "BQ" parity 1911 of the existing "node 0" into the added "node 4" based on the image 1940 since there is a need for an area for storing the "EP" parity in the "node 0". Further, the storage system 1 reconstructs the "DP" and "CQ" parity 1912 of the "node 1" into the "node 0" as an empty area since there is a need for an area for storing the "EQ" parity in the "node 1".

In image 1920, based on image 1940, the storage system 1 calculates an XOR 1923 of "E1" data 1921 (what is stored is "D1" data that constitutes the existing stripe) and "E2" data 1922 that constitute a new stripe, and generates and stores "EP" parity 1924 in the "DP" segment after movement. Further, based on the image 1940, the storage system 1 calculates an XOR 1925 of the "E1" data 1921 and the "E2" data 1922 that constitute the new stripe, and generates "EQ" parity 1926 in the "EQ" segment.

In image 1930, based on the image 1940, for the stripe "D1-D2-DP-DQ" in which a combination of data is changed in the existing stripes, the storage system 1 calculates an XOR 1933 of "D1" data 1931 and "D2" data 1932 that constitute the stripe after the change, and generates "DP" parity 1934 after the change. In addition, the storage system 1 calculates an XOR 1935 of the "D1" data 1931 and the "D2" data 1932 that constitute the stripe after the change, and generates "DQ" parity 1936 after the change.

In the image 1940, the parity is calculated to show that the stripe is rearranged without moving the data.

As described with reference to FIG. 12 in the first embodiment, the data transfer between the nodes 100 may be optimized.

According to the present embodiment, for example, even in the data protection policy with two pieces of parity, it is possible to add nodes without affecting the performance of the existing volume before and after the configuration change.

(3) Third Embodiment

The present embodiment is mainly different from the first embodiment in that data is encoded and parity is generated and stored in the encoded data and the data under the write request in order to reduce the amount of transfer of the network. In the present embodiment, the description of the same points as those in the first embodiment will be omitted as appropriate, and different points will be mainly described. Hereinafter, a case where the data protection policy is Multi-stage Erasure Coding (MEC) will be described as an example. The MEC is disclosed in WO2016/052665, and may be incorporated as necessary.

Figure 20:
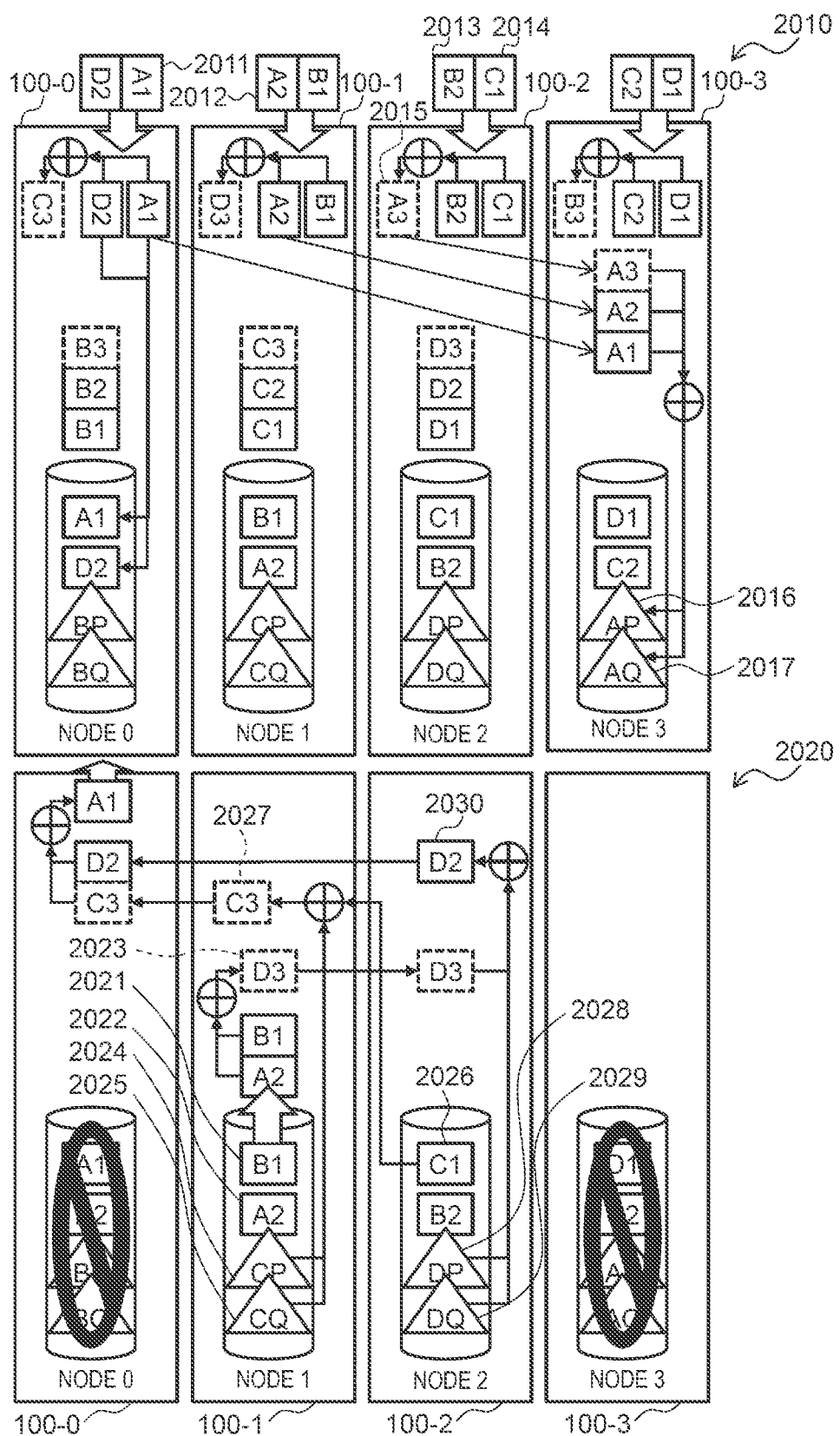
FIG. 20 is an image diagram showing an outline of a MEC according to a third embodiment.

FIG. 20 is an image diagram showing an outline of a MEC. In FIG. 20, an encoding processing image 2010 and a decoding processing image 2020 are shown.

As shown in the encoding processing image 2010, for example, in the node 100-3, "A1" data 2011 written in the node 100-0 is transferred from the node 100-0. Further, "A2" data 2012 written in the node 100-1 is transferred from the node 100-1. Further, "A3" data 2015 obtained by first encoding (for example, XOR calculation) "B2" data 2013 and "C1" data 2014 written in the node 100-2 is transferred from the node 100-2.

In the node 100-3, by using the transferred "A1" data 2011, "A2" data 2012, and "A3" data 2015, "AP" parity 2016 is generated by secondary encoding (for example, XOR calculation) and "AQ" parity 2017 is generated by secondary encoding (for example, Galois calculation). For the update of the parity, when the data is not aligned, intermediate data calculated by XOR and the old data are transferred, and the parity is updated in Read Modify Write (RMW) operation. Further, the data may be cached in the memory 212, the drive 213, or the like until the data is aligned.

As shown in the decoding processing image 2020, for example, when a failure occurs in the node 100-0 and the node 100-3, "A1" 2011 of the node 100-0 is restored from the data and parity of the node 100-1 and the node 100-2.

More specifically, in the node 100-1, the stored "B1" data 2021 and the "A2" data 2022 are decoded, and "D3" data 2023 is generated and transferred to the node 100-2. In the node 100-1, "C3" data 2027 is generated using "CP" parity 2024, "CQ" parity 2025, and the "C1" data 2026 transferred from the node 100-2, and is transferred to the node 100-0.

In addition, in the node 100-2, "D2" data 2030 is generated using "DP" parity 2028, "DQ" parity 2029, and "D3" data 2023 transferred from the node 100-1, and is transferred to the node 100-0.

In addition, the node 100-0 restores the "A1" data 2011 by using the transferred "C3" data 2023 and the "D2" data 2030.

In other words, in the data protection policy of the mDnP, it is necessary to transfer m×n data in EC; however, in MEC, by performing primary encoding, it is possible to transfer m+n−1 data so as to reduce the amount of transfer.

Figure 21:
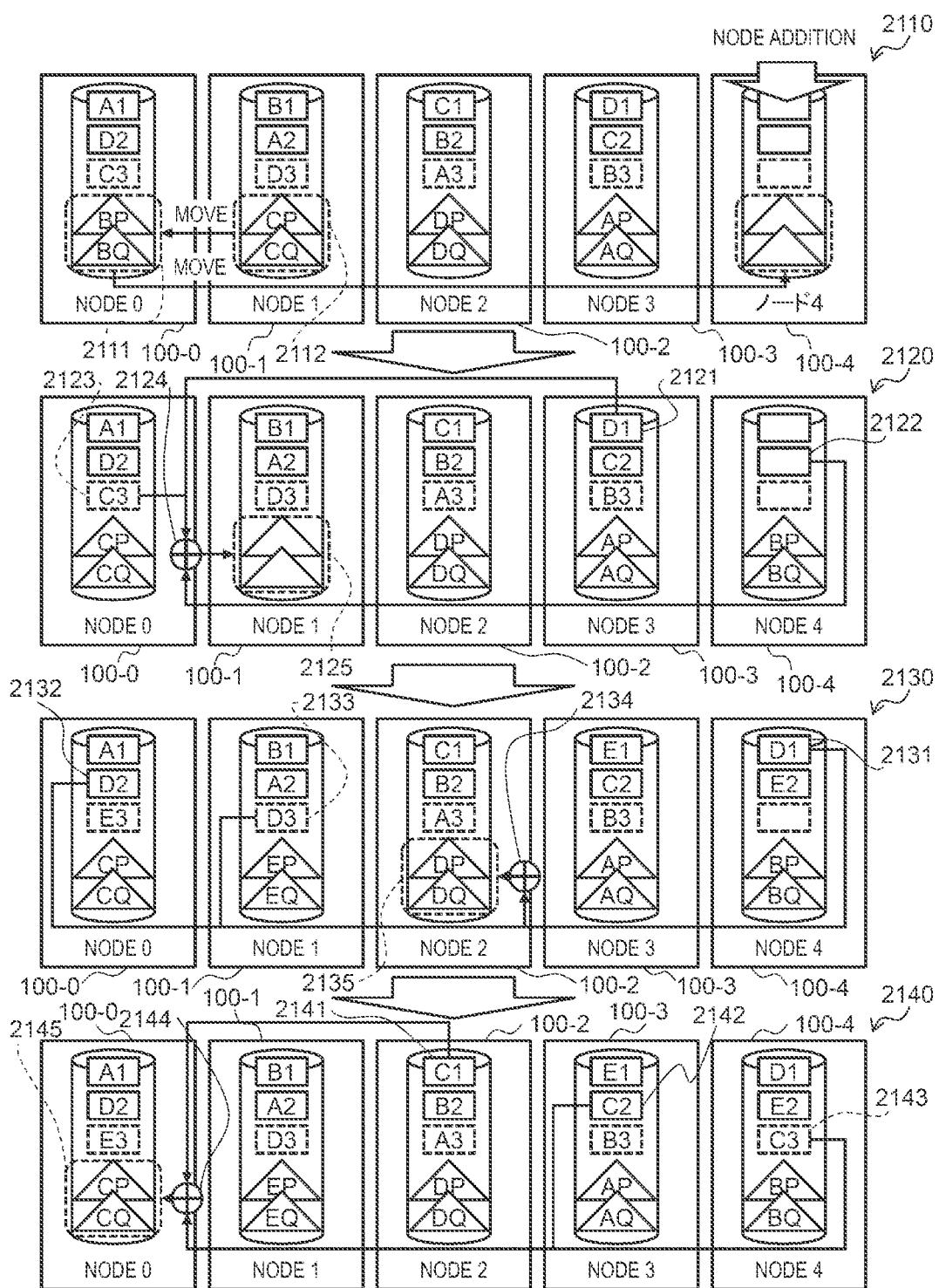
FIG. 21 is an image diagram showing a characteristic configuration of a mapping change according to the third embodiment.

FIG. 21 is an image diagram showing a characteristic configuration (outline of operation in a frame) of the mapping change.

When the data protection policy is the MEC, the main processing of the mapping change is basically the same as that in the case where the data protection policy is the EC.

<Processing A>

Parity of a part of the existing nodes 100 is reconstructed (moved or recalculated) to the added node 100.

<Processing B>

Parity of a new stripe is generated.

<Processing C>

Parity is generated for a stripe in which a combination of data changes in existing stripes.

In the present example, processing A is shown as an image 2110, processing B is shown as an image 2120, processing C is shown as images 2130 and 2140, and a state after mapping change is shown as an image 2140. In the present example, "A1-A2-A3-AP-AQ", "B1-B2-B3-BP-BQ", "C1-C2-C3-CP-CQ", and "D1-D2-D3-DP-DQ" indicate existing stripes, and "E1-E2-E3-EP-EQ" indicates a new stripe.

In the present example, it is assumed that mapping information is generated in the stripe shown in the image 2140. In other words, since the data protection policy is MEC (2D2P), the mapping information is preferably generated so that data:parity=2:2 in each node 100. Note that, "A3" data is virtual data that does not exist on the node 100, and when accessing, "A1" data and "D2" data are read out and calculated by XOR. The same applies to "B3", "C3", "D3", and "E3".

In the image 2110, based on the image 2140, the storage system 1 reconstructs "BP" and "BQ" parity 2111 of the existing "node 0" into the added "node 4". Further, the storage system 1 reconstructs the "CP" and "CQ" parity 2112 of the "node 1" into the "node 0" as an empty area since there is a need for an area for storing the "EP" and "EQ" parity in the "node 1".

In the image 2120, based on the image 2140, in the "CP" and "CQ" segments before movement, the storage system 1 performs secondary encoding 2124 using "E1" data 2121 (what is stored is "D1" data that constitutes the existing stripe), "E2" data 2122 and "E3" data 2123 (which is obtained by primary encoding of "A1" data and "D2" data) that constitute a new stripe, and generates and stores "EP" and "EQ" parity 2125.

In the image 2130, based on the image 2140, the storage system 1 performs secondary encoding 2134 using "D1" data 2131, "D2" data 2132, and "D3" data 2133 (which is obtained by primary encoding of "B1" data and "A2" data) that constitute a stripe after the change for the stripe "D1-

D2-D3-DP-DQ" in which the combination of data is changed in the existing stripes, and generates "DP" and "DQ" parity 2135 after the change.

In the image 2140, based on the image 2140, the storage system 1 performs secondary encoding 2144 using "C1" data 2141, "C2" data 2142, and "C3" data 2143 (which is obtained by primary encoding of "D1" data and "E2" data) that constitute a stripe after the change for the stripe "C1-C2-C3-CP-CQ" in which the combination of data is changed in the existing stripes, and generates "CP" and "CQ" parity 2145 after the change.

Further, in the image 2140, the parity is calculated to show that the stripe is rearranged without moving the data.

According to the present embodiment, for example, even when the data protection policy is MEC, it is possible to add nodes without affecting the performance of the existing volume before and after the configuration change.

(4) Fourth Embodiment

The present embodiment will be described in terms of reducing the node 100. In the present embodiment, the description of the same points as those in the first embodiment will be omitted as appropriate, and different points will be mainly described. Hereinafter, a case where the data protection policy is 2D1P will be described as an example.

Figure 22:
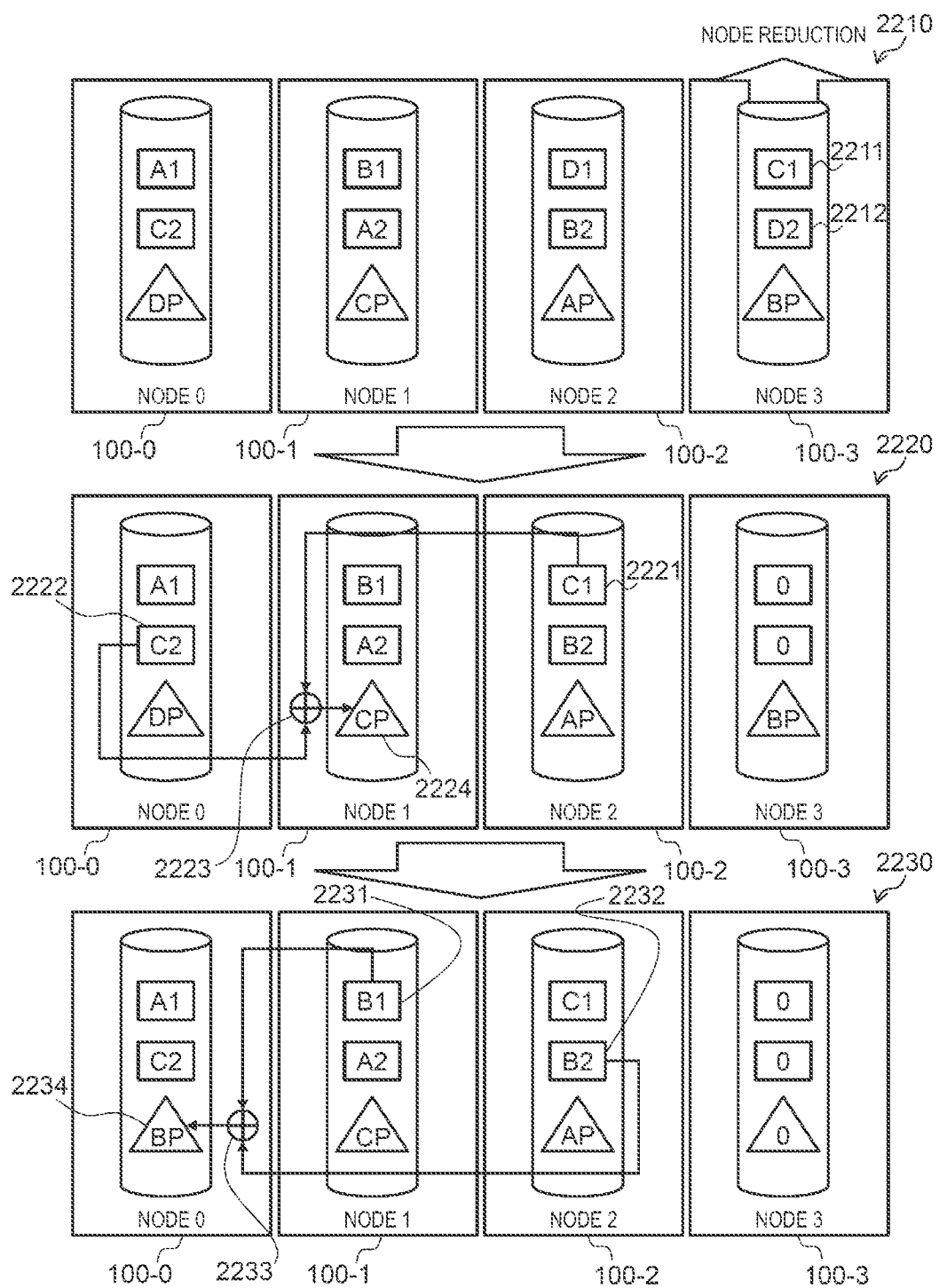
FIG. 22 is an image diagram showing a characteristic configuration of a mapping change according to a fourth embodiment.

FIG. 22 is an image diagram showing a characteristic configuration (outline of operation in a frame) of the mapping change.

When reducing the node, the main processing of the mapping change is as follows.
<Processing A>
Data of the node 100 to be reduced is moved to another node 100 in advance.
<Processing B>
Parity is generated for a stripe in which a combination of data changes in an existing stripe.
<Processing C>
Parity is reconstructed for the parity of the node 300 to be reduced.

In the present example, the processing A is shown as an image 2210, the processing B is shown as an image 2220, the processing C is shown as an image 2230, and a state after the mapping change is shown as an image 2230. In the present example, "A1-A2-AP", "B1-B2-BP", "C1-C2-CP", and "D1-D2-DP" indicate existing stripes, and "D1-D2-DP" indicates a stripe to be reduced.

In the image 2210, based on image 2230, the storage system 1 executes the movement of "C1" data 2211 and "D1" data 2212 of the node 100-3 to be reduced in the host node 300 (application program side) and clears (for example, 0 clear) the "C1" data 2211 and the "D1" data 2212.

In the image 2220, based on the image 2230, for the stripe "C1-C2-CP" in which a combination of data is changed in the existing stripes, the storage system 1 calculates an XOR 2223 of "C1" data 2221 and "C2" data 2222 that constitute the stripe after the change, and generates "CP" parity 2224 after the change.

In the image 2230, based on the image 2230, for the stripe "B1-B2-BP" including the "BP" of the "node 3" to be reduced, the storage system 1 calculates an XOR 2233 of "B1" data 2231 and "B2" data 2232 that constitute the stripe, and generates "BP" parity 2234 in "DP" that stores the parity of the stripe to be reduced. The "BP" parity 2234 may be reconstructed by moving instead of generating. Note that, the parity of the node 100 to be reduced may also be cleared (for example, cleared to 0).

According to the present embodiment, it is possible to reduce nodes, without affecting the performance of the existing volume before and after the configuration change, for example.

(5) Fifth Embodiment

The present embodiment is mainly different from the first embodiment in that a new chunk group 302 is added instead of applying an existing chunk group 302 at the time of adding the node 100. In the present embodiment, the description of the same points as those in the first embodiment will be omitted as appropriate, and different points will be mainly described.

Figure 23:
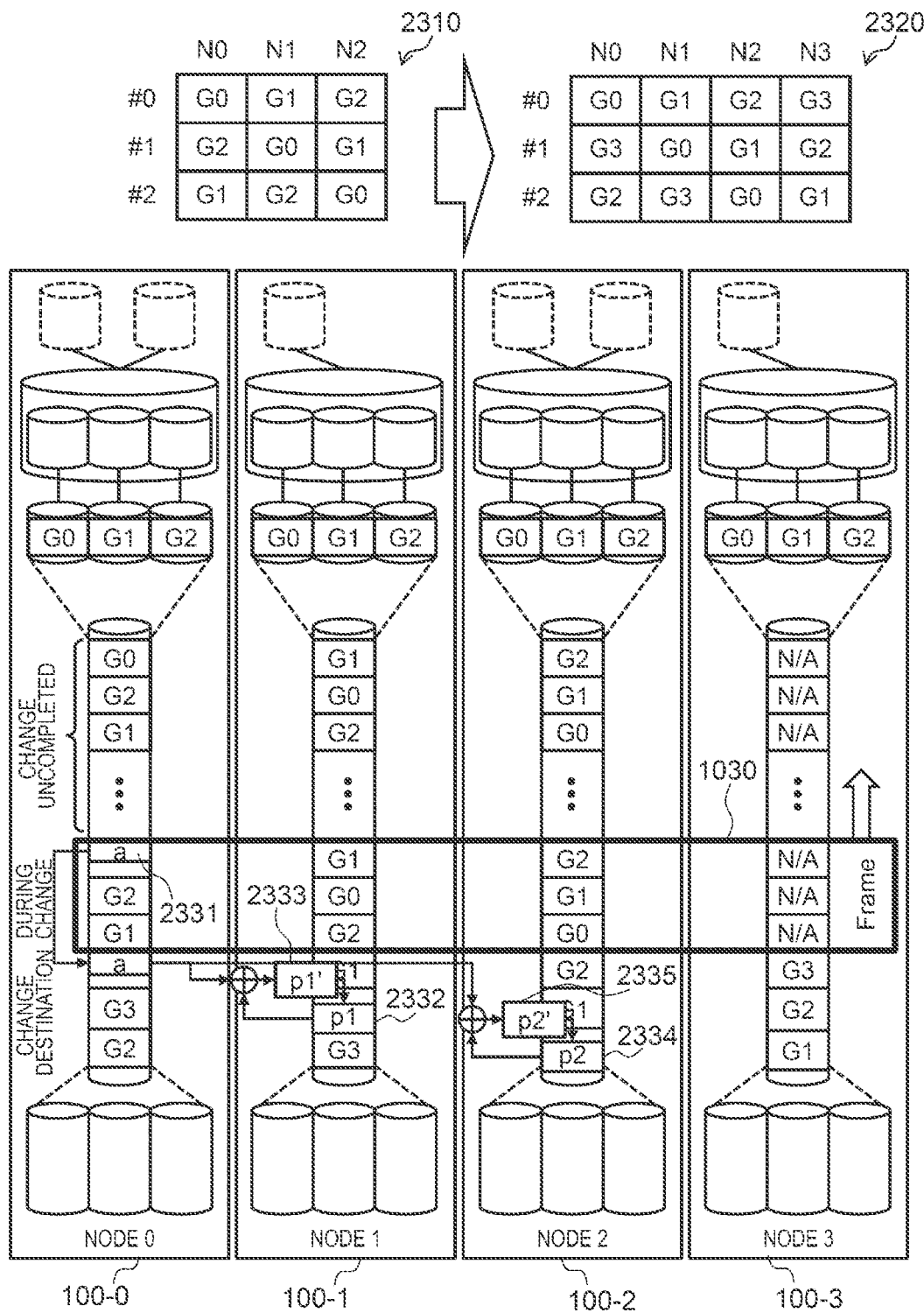
FIG. 23 is an image diagram showing an outline of a mapping change according to a fifth embodiment.

FIG. 23 is an image diagram showing an outline of the mapping change. Here, as shown in chunk mapping management information 2310 and chunk mapping management information 2320, a case in which "N3" of node 100 (node 100-3) is added will be described as an example.

As shown in the chunk mapping management information 2320, "G3" is added as a new chunk group 302.

In the storage system 1, since the offset in the node 100 is used from an upper level offset, the mapping is changed using the unused lowest level offset. After the unused offset mapping is switched, the data is copied from the area of the physical chunk 301 at the same position in the frame of the upper level offset. The parity is calculated and constructed at the time of copying. Since the movement of the data is movement of the data in the node 100, the data locality is not lost.

For example, when data 2331 of the movement source chunk constituting the chunk group 302 of "G0" is copied to the movement destination chunk, the data 2331 is transferred to other nodes 100 (node 100-1, node 100-2) constituting the chunk group 302 of "G0". Upon receiving the data 2331, the node 100-1 calculates and stores new parity 2333 by using the transferred data 2331 and the old parity 2332. Further, upon receiving the data 2331, the node 100-2 calculates and stores new parity 2335 by using the transferred data 2331 and the old parity 2334.

In the movement of data described above, the storage pool 305 is not aware that the data is moved before and after the movement of the data.

Figure 24:
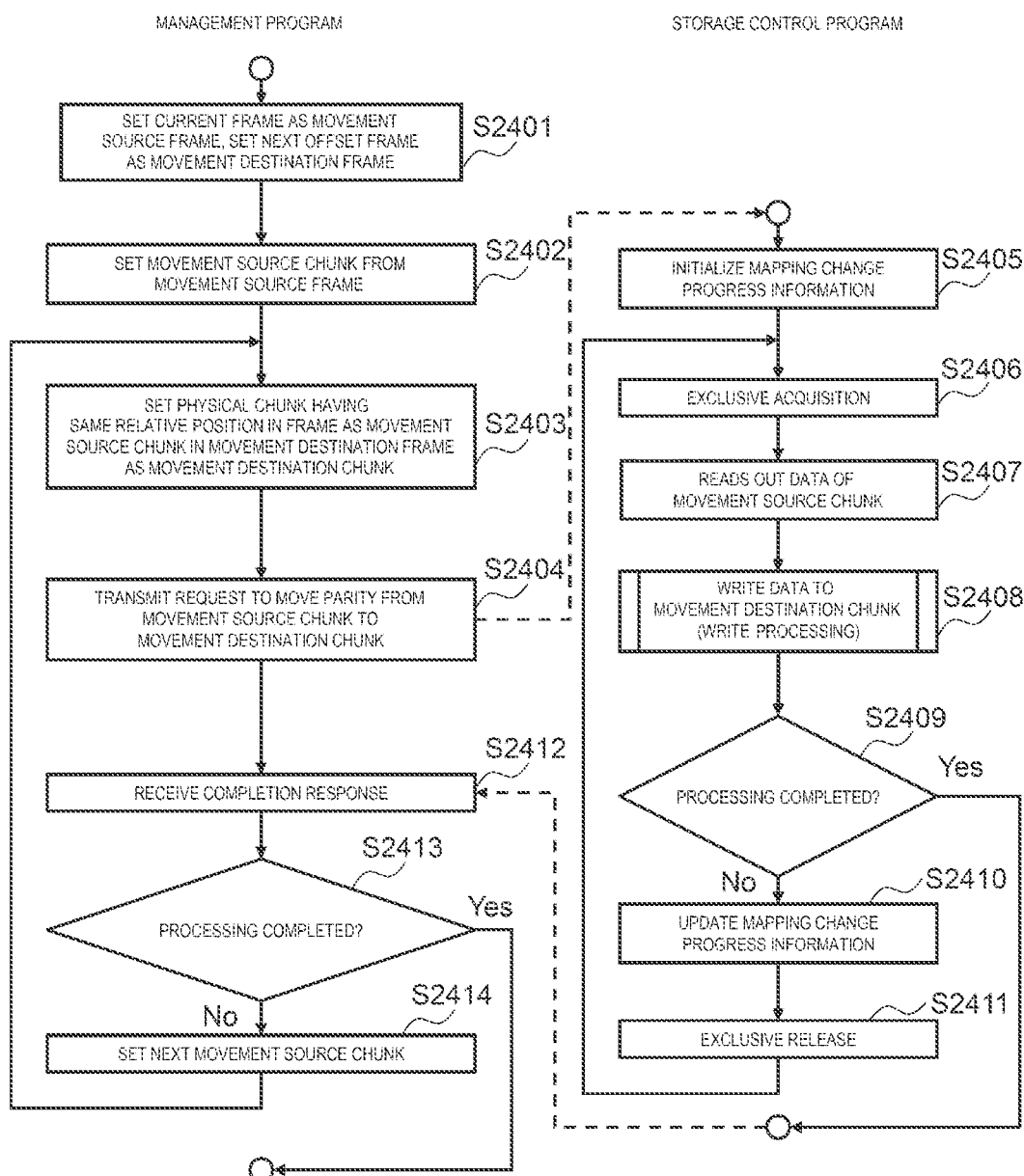
FIG. 24 is a diagram showing an example of a flowchart related to a mapping change processing according to the fifth embodiment.

FIG. 24 is a diagram showing an example of a flowchart related to a mapping change processing.

In step S2401, the addition/reduction management processing unit 421 sets the current frame as a movement source frame, and sets a next offset frame as a movement destination frame.

In step S2402, the addition/reduction management processing unit 421 sets a movement source chunk from the movement source frame.

In step S2403, the addition/reduction management processing unit 421 sets the physical chunk 301 having the same relative position in the frame as the physical chunk 301 of the movement source (movement source chunk) in the movement destination frame as the physical chunk 301 of the movement destination (movement destination chunk).

In step S2404, the addition/reduction management processing unit 421 transmits a request (movement request) to move the parity from the movement source chunk to the movement destination chunk to the node 100 having the movement source chunk.

In step S2405, the mapping change processing unit 433 of the node 100 that has received the movement request initializes the mapping change progress information 724.

In step S2406, the mapping change processing unit 433 performs exclusive acquisition.

In step S2407, the mapping change processing unit 433 reads out the data of the movement source chunk.

In step S2408, the mapping change processing unit 433 writes the data to the movement destination chunk. The mapping change processing unit 433 performs the write processing shown in FIG. 14 in the same manner as the write processing of the host node 300. At this time, the write processing unit 432 writes the data with an attribute that the write destination has been changed during the mapping change.

In step S2409, the mapping change processing unit 433 determines whether or not the processing for all the areas in the physical chunk 301 is completed. When the mapping change processing unit 433 determines that the processing is completed, the processing of step S2412 is performed, and when determines that the processing is not completed, the process is moved to step S2410.

In step S2410, the mapping change processing unit 433 updates the mapping change progress information 724.

In step S2411, the mapping change processing unit 433 performs exclusive release, and the process is moved to step S2406.

In step S2412, the addition/reduction management processing unit 421 receives the completion response.

In step S2413, the addition/reduction management processing unit 421 determines whether or not the processing for all the physical chunks 301 in the frame is completed. When the addition/reduction management processing unit 421 determines that the processing is completed, the current frame is set to the previous offset frame, and processing of S2401 to S2414 is repeated for all the offsets. When the addition/reduction management processing unit 421 determines that the processing is not completed, the process is moved to step S2414.

In step S2414, the addition/reduction management processing unit 421 sets a next movement source chunk, and the process is moved to step S2403.

According to the present embodiment, for example, even when a chunk group is added, it is possible to add nodes without affecting the performance of the existing volume before and after the configuration change.

(6) Other Embodiments

Although the embodiments described above describe the case where the invention is applied to a storage system, the invention is not limited thereto, and can be widely applied to other types of systems, apparatuses, methods, and programs.

Further, in the embodiments described above, the configuration of each table is an example, and one table may be divided into two or more tables, or all or a part of the two or more tables may be one table.

Further, although various types of data are described using the XX table in the embodiments described above, the data structure is not limited thereto and may be expressed as XX information or the like.

In the description described above, information such as a program, a table, a file, and the like for implementing each function can be stored in a storage device such as a memory, a hard disk, and a Solid State Drive (SSD), or a recording medium such as an IC card, an SD card, or a DVD.

The invention may have the following characteristic configurations.

For example, provided is a storage system (for example, storage system 1) including a plurality of nodes (for example, nodes 100) and a management unit (for example, the management program 101). The storage system is characterized in that the nodes are targets for data write and read requests, form a stripe by a plurality of data stored in different nodes and parity generated based on the plurality of data, and store the parity of the stripe to which the data under the write request belongs in a node different from the plurality of nodes that store the plurality of data so as to perform redundancy (EC of mDnP, MEC of mDnP, and the like); and the management unit transmits, to the node, an arrangement change request (for example, the mapping change request) to perform inter-node movement of the parity and reconfiguration of the stripe when the node configuration is changed (addition/reduction of the nodes 100, addition/reduction of the sites 210, and the like).

According to the configuration described above, it is possible to change the configuration by, for example, calculating the parity of the stripe rearranged in accordance with the change in configuration.

Further, for example, the storage system is characterized in that the node stores data related to the received write request in a volume of an own node.

Further, for example, the storage system is characterized in that the arrangement change request does not move the data between the nodes.

According to the configuration described above, it is possible to change the configuration by, for example, calculating the parity of the stripe rearranged in accordance with the change in configuration without moving the data to another node.

Further, for example, the storage system is characterized in that the node stores data related to the received write request, data stored in a plurality of other nodes, and parity that forms a stripe; a change in the configuration is a change of adding a node; and according to the arrangement change request, parity stored in any one of the nodes is moved into the added node, and a stripe is formed by data in the added node, and data and parity stored in the existing nodes.

According to the configuration described above, for example, the parity can be held at each node.

Further, for example, the storage system is characterized in that the stripe (for example, B1-B2-BP) in which the parity is moved and a stripe (for example, D1-D2-DP) to be newly formed are different stripes.

Further, for example, the storage system is characterized in that the reconfiguration of the stripe calculates the parity by adding data in the added node as predetermined data (in the embodiments described above, although the case where all data are "0" is exemplified, all data may be "1") to the stripe.

According to the configuration described above, for example, since it is not necessary to transfer data in the added node, the amount of data transfer between the nodes can be reduced.

Further, for example, the storage system is characterized in that the parity of the newly formed stripe is stored in the node that stored the parity which is moved to the added node.

Further, for example, the storage system is characterized in that a redundancy group (for example, the chunk group 302) including a physical area (for example, the physical chunk 301) of a plurality of nodes is constructed, and a logical area (for example, the logical chunk 303) logically cut out from the constructed redundancy group is allocated as a storage pool (for example, the storage pool 305); and the management unit transmits the arrangement change request when a physical area linked to the logical area allocated to the storage pool is a processing target (for example, see step S1607 and step S1608).

According to the configuration described above, for example, it is possible to reduce the data transfer cost between the nodes at the time of mapping change by removing a physical chunk that is not allocated to the storage pool from a processing target.

Further, for example, the storage system is characterized in that the management unit transmits the request with one or a plurality of redundancy groups as a processing unit (for example, a frame).

According to the configuration described above, for example, since one or a plurality of redundancy groups can be collectively processed as in units of the frame, the communication cost between the management unit and the nodes can be reduced.

Further, for example, the storage system is characterized in that when a data protection policy is set as mDnP, the management unit generates arrangement information (chunk group mapping information, mapping information, and the like) so that the number of data to be allocated to each node is m and the number of parity to be allocated to each node is n.

According to the configuration described above, for example, a situation in which the load of one node increases due to the parity being stored in a biased manner in the node can be avoided.

Further, for example, the storage system is characterized in that the management unit compares the arrangement information before the configuration change with the arrangement information after the configuration change, and transmits the arrangement change request such that parity is calculated for an area (for example, the physical chunk 301) in which the arrangement of the parity is changed (for example, see step S1704 and step S1705).

According to the configuration described above, for example, the data transfer cost between the nodes at the time of mapping change can be reduced by removing a physical area that does not require parity calculation from the processing target.

Further, for example, the storage system is characterized in that when a change in the configuration is to change a drive (for example, the drive 213), the management unit transmits a request to move data and parity to the drive or a request to move data and parity from the drive to a node whose drive is changed (for example, see step S1602).

According to the configuration described above, for example, the movement cost can be reduced by moving the data and the parity between drives in the node (by moving each data).

Further, for example, the storage system is characterized in that a node that has received the data under the write request stores the data in the own node (for example, in the data protection policy of 2D1P, when the stripe shown in the image 1130 of FIG. 11 is assembled and the node 100-0 received the data under the write request, the data is stored in "A1" and "C2"), generates intermediate data that shows the difference between the data and old data of the data (for example, generates intermediate data of "A1" data and intermediate data of "C2" data), specifies a redundancy destination node based on the arrangement information (for example, specifies the node 100-2 that stores "A1" parity and the node 100-1 that stores "C2" parity), and transmits the intermediate data to the specified node; and a node that has received the intermediate data calculates the parity of the data based on the intermediate data and the parity of the old data by using the intermediate data received from a plurality of nodes for one parity.

According to the configuration described above, for example, in the EC in which the data locality is held, since the configuration can be changed without losing the data locality, it is possible to avoid a situation in which the storage performance is decreased due to the configuration change.

Further, for example, the storage system is characterized in that the management unit generates arrangement information including a new redundancy group in accordance with the change in the configuration, and transmits a request to construct parity in accordance with the arrangement information to each node.

In the configuration described above, for example, although the data is moved in the node, the configuration can be changed without moving the data between the nodes by recalculating the parity of the redundancy group (stripe) changed in accordance with the configuration change. According to the configuration described above, since the data locality is not lost, it is possible to avoid a situation in which the storage performance is decreased due to the configuration change.

Further, for example, the storage system is characterized in that redundancy (for example, MEC) is performed by storing a secondary code (for example, "AP" parity 2016 and "AQ" parity 2017) as parity in a third node (for example, the node 100-3) which is different from a first node and a second node, the secondary code being generated based on a primary code (for example, "A3" data 2015) generated from a plurality of data stored in the first node (for example, "B2" data 2013 and "C1" data 2014 of the node 100-2 shown in FIG. 20) and data stored in the second node which is different from the first node (for example, "A1" data 2011 of the node 100-0 and "A2" data 2012 of the node 100-1); and the first node that has received the arrangement change request (for example, the node 100-1 shown in FIG. 21) calculates the primary code (for example, "D3" data 2133) based on a plurality of stored data ("B1" data and "A2" data), specifies a node (for example, the node 100-2 that stores parity (for example, "DP" and "DQ" parity 2135) related to the redundancy using the primary code from the arrangement information and transmits the primary code.

According to the configuration described above, for example, in the MEC in which the data locality is held, since the configuration can be changed without losing the data locality, it is possible to avoid a situation in which the storage performance is decreased due to the configuration change.

The invention is useful for adding or reducing a node and a device in an SDS system, for example. For example, since a high-performance SDS system can be flexibly constructed and operated using inexpensive network equipment, the usefulness of the invention is high.

In addition, the above configuration may be modified, rearranged, combined, or omitted as appropriate without departing from the scope of the invention.

What is claimed is:

1. A storage system comprising:
a plurality of nodes, each of which includes a processor and a drive; and
a management unit,
wherein each of the nodes stores data in the drive, receives data write and read requests, and writes and reads the data stored in the drive of its own node;
wherein the plurality of nodes generate parity based on a plurality of pieces of data stored in different nodes, store the parity in a drive of a node different from the plurality of nodes, and form a stripe from the plurality of pieces of data and the parity generated based on the plurality of pieces of data;
wherein when a node is added or reduced, the management unit transmits an arrangement change request to the plurality of nodes, and
wherein according to the arrangement change request, the plurality of nodes move the parity, which is generated based on the data, between a node which is not added or reduced, and the added or reduced node without moving the data.

2. The storage system according to claim 1,
wherein according to the arrangement change request, the plurality of nodes perform reconfiguration of the stripe stored in the node which is not added or reduced, by changing a combination of the data constituting the stripe and generating parity based on the data stored in the added or reduced node and the data stored in the node which is not added or reduced.

3. The storage system according to claim 1,
wherein the addition or reduction of the node is to reduce the node; and
wherein the data stored in the reduced node is moved to the node which is not reduced, and the parity is generated in the moved data and stored in the node.

4. The storage system according to claim 3,
wherein the parity stored in the reduced node is stored in the node which is not reduced, by moving or regenerating the parity.

5. The storage system according to claim 2,
wherein the addition or reduction of the node is to add or reduce a site including a plurality of nodes; and
wherein according to the arrangement change request, the plurality of nodes move the parity, which is generated based on the data, between the node which is not added or reduced, and the added or reduced site without moving the data, and perform reconfiguration of the stripe stored in the node which is not added or reduced, by changing a combination of the data constituting the stripe and generating parity based on the data stored in the added or reduced site and the data stored in the node which is not added or reduced.

6. The storage system according to claim 1,
wherein the node stores data related to the received write request in a volume of its own node.

7. The storage system according to claim 2,
wherein the stripe in which the parity is moved and a stripe to be newly formed are different stripes.

8. A storage system comprising:
a plurality of nodes, each of which includes a processor and a drive; and
a management unit,
wherein each of the nodes stores data in the drive, receives data write and read requests, and writes and reads the data stored in the drive of its own node;
wherein the plurality of nodes generate parity based on a plurality of pieces of data stored in different nodes, store the parity in a drive of a node different from the plurality of nodes, and form a stripe from the plurality of pieces of data and the parity generated based on the plurality of pieces of data;
wherein when a node is added or reduced, the management unit transmits an arrangement change request to the plurality of nodes, and
wherein according to the arrangement change request, the plurality of nodes perform reconfiguration of the stripe stored in the node which is not added or reduced, by changing a combination of data constituting the stripe and generating parity based on the data stored in the added or reduced node and the data stored in the node which is not added or reduced.

9. A configuration change method for a storage system including:
a plurality of nodes, each of which includes a processor and a drive; and
a management unit;
the configuration change method comprising:
storing, by each of the nodes, data in the drive;
receiving, by each of the nodes, data write and read requests and writing and reading the data stored in the drive of its own node;
generating, by the plurality of nodes, parity based on a plurality of pieces of data stored in different nodes and storing the parity in a drive of a node different from the plurality of nodes;
forming, by the plurality of nodes, a stripe from the plurality of pieces of data and the parity generated based on the plurality of pieces of data;
when a node is added or reduced, transmitting, by the management unit, an arrangement change request to the plurality of nodes;
moving, by the plurality of nodes according to the arrangement change request, the parity, which is generated based on the data, between a node which is not added or reduced, and the added or reduced node without moving the data; and
performing, by the plurality of nodes according to the arrangement change request, reconfiguration of the stripe stored in the node which is not added or reduced, by changing a combination of the data constituting the stripe and generating parity based on the data stored in the added or reduced node and the data stored in the node which is not added or reduced.

* * * * *